US011968137B2

(12) United States Patent
Liu et al.

(10) Patent No.: US 11,968,137 B2
(45) Date of Patent: Apr. 23, 2024

(54) SIGNALING CONFIGURATIONS FOR COMMUNICATION WITH UNMANNED AERIAL SYSTEMS

(71) Applicant: QUALCOMM Incorporated, San Diego, CA (US)

(72) Inventors: Le Liu, Fremont, CA (US); Alberto Rico Alvarino, San Diego, CA (US); Peter Gaal, San Diego, CA (US); Chiranjib Saha, Blacksburg, VA (US); Umesh Phuyal, San Diego, CA (US); Xiao Feng Wang, San Diego, CA (US); Juan Montojo, San Diego, CA (US); Vishnu Vardhan Chetlur Ravi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/194,161

(22) Filed: Mar. 5, 2021

(65) Prior Publication Data
US 2022/0286247 A1 Sep. 8, 2022

(51) Int. Cl.
*H04W 84/18* (2009.01)
*H04L 5/00* (2006.01)
*H04W 84/12* (2009.01)

(52) U.S. Cl.
CPC .................. *H04L 5/0048* (2013.01)

(58) Field of Classification Search
CPC .................................................. H04L 5/0048
USPC ......................................................... 370/310
See application file for complete search history.

(56) References Cited

U.S. PATENT DOCUMENTS

| 10,574,338 | B1 * | 2/2020 | Chang ............... H04B 7/18504 |
| 2019/0215220 | A1 * | 7/2019 | Islam ................ H04W 74/0833 |
| 2020/0204314 | A1 | 6/2020 | Kang et al. |
| 2020/0260300 | A1 * | 8/2020 | Cirik .................. H04W 72/046 |

(Continued)

FOREIGN PATENT DOCUMENTS

| CN | 110430542 A | * 11/2019 | ......... H04B 7/18504 |
| WO | WO-2022077438 A1 | * 4/2022 | |

OTHER PUBLICATIONS

China Telecom (RP-200861, Jun. 29-Jul. 3, 2020, Revised SID on Study on NR coverage enhancements). (Year: 2020).*

(Continued)

*Primary Examiner* — Maharishi V Khirodhar
(74) *Attorney, Agent, or Firm* — Arent Fox, LLP

(57) ABSTRACT

An apparatus may be configured to communicate at least one pilot signal with another apparatus according to a first configuration, at least one of a lower frequency density or a higher time density being indicated by the first configuration than a second configuration for a type of pilot signal that includes the at least one pilot signal. The apparatus may be further configured to communicate with the other apparatus based on the at least one pilot signal. Another apparatus may be configured to receive, from a base station, spatial relationship information or transmission configuration indicator (TCI) state information corresponding to a directional beam at the UE for communication on a channel. The apparatus may be further configured to apply the directional beam for communication with the base station on another channel in a sub-6 gigahertz (GHz) frequency band.

30 Claims, 15 Drawing Sheets

(56) References Cited

U.S. PATENT DOCUMENTS

| | | | | |
|---|---|---|---|---|
| 2021/0314953 | A1* | 10/2021 | Park | H04W 76/11 |
| 2022/0022220 | A1* | 1/2022 | Harada | H04B 7/0404 |
| 2022/0321292 | A1* | 10/2022 | Matsumura | H04W 72/23 |
| 2023/0056263 | A1* | 2/2023 | Kim | H04L 5/0094 |
| 2023/0217460 | A1* | 7/2023 | Zhang | H04W 72/232 |
| | | | | 370/329 |

OTHER PUBLICATIONS

International Search Report and Written Opinion—PCT/US2022/070990—ISA/EPO—dated Jul. 28, 2022.
Ericsson: "Introduction of Release-15 Aerial functionality", 3GPP TSG-WG2 Meeting #103. 3GPP Draft, 36331_CR3437R5_(REL-15)_R2-1813444_Introduction of Aerial Functionality_Update, 3rd Generation Partnership Project (3GPP), Mobile Competence Centre, 650, Route Deslucioles, F-06921 Soph, no. Gothenburg, Sweden, Aug. 20, 2018-Aug. 24, 2018, Sep. 9, 2018 (Sep. 9, 2018), XP051551354, 118 Pages, Retrieved from the Internet: URL: http://www.3gpp.org/ftp/Meetings%5F3GPP%5FSYNC/RAN/Docs/RP%2D181956%2Ezip [retrieved on Sep. 9, 2018] section 5.5.4.1x.
Etri: "Considerations on NR Impacts for Non-Terrestrial Networks", 3GPP Draft, R1-1804495, 3GPP TSG RAN WG1 Meeting #92bis, Considerations on NR Impacts for Non-Terrestrial Networks, 3rd Generation Partnership Project (3GPP), Mobile Competence Centre, 650, Route Des Lucioles, F-06921, Soph-Antipol, vol. RAN WG1, no. Sanya, China, Apr. 16, 2018-Apr. 20, 2018, Apr. 7, 2018 (Apr. 7, 2018), XP051413924, pp. 1-3, Retrieved from the Internet: URL: http://www.3gpp.org/ftp/tsg%5Fran/WG1%5FRL1/TSGR1%5F92b/Docs/ [retrieved on Apr. 7, 2018] section 2.
Partial International Search Report—PCT/US2022/070990—ISA/EPO—dated Jun. 7, 2022.

\* cited by examiner

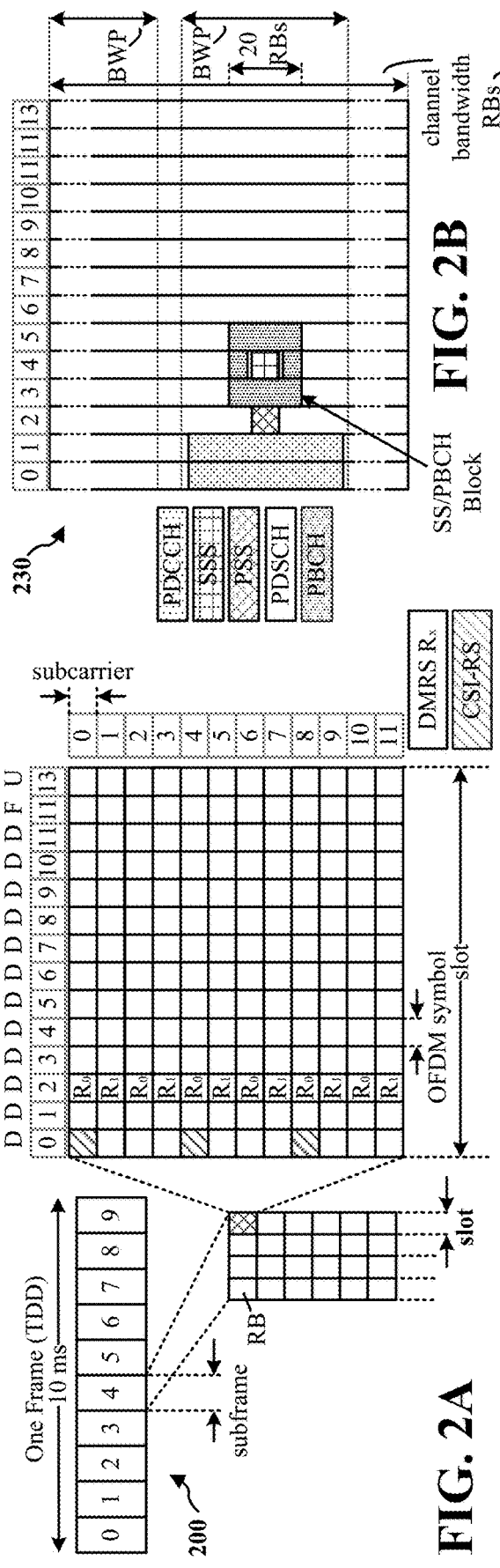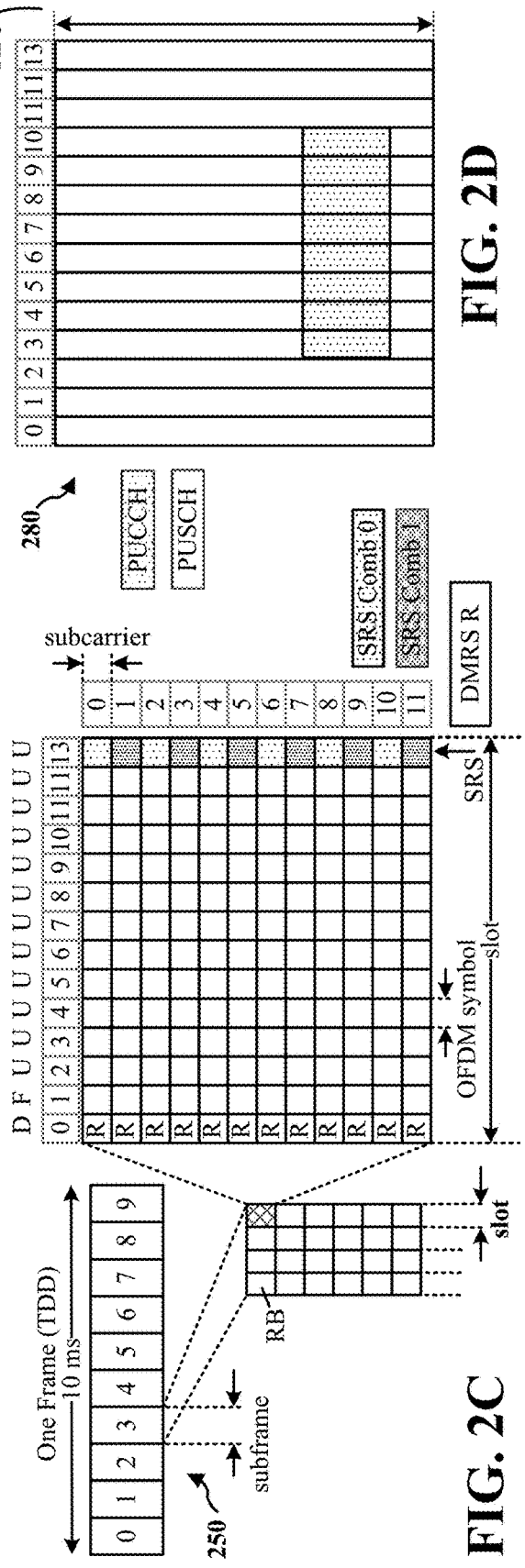

SIGNALING CONFIGURATIONS FOR COMMUNICATION WITH UNMANNED AERIAL SYSTEMS

BACKGROUND

Technical Field

The present disclosure generally relates to communication systems, and more particularly, to signaling configurations in networks for unmanned aerial systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

User equipments (UEs) are frequently implemented across a broad range of areas and, in particular, the application of UEs to aircraft is increasingly common. For example, UEs can be applied as unnamed aerial vehicle (UAVs) or drones, which may transmit and receive signaling while in flight. In recognition of UAVs becoming more common, the Federal Communications Commission (FCC) has issued a report on the frequency spectrum for UAVs—specifically, the FCC report supported a frequency band of 5030-5091 megahertz (MHz) frequency band for UAV operations.

While such a frequency band may be dedicated to UAVs, UAVs may be configured to communicate in some or all of a cellular spectrum, for example, including Frequency Range (FR) FR 2. Accordingly, UAVs may access and connect with a base station, e.g., for some functionality or other connectivity. However, base stations may be communicate with terrestrial UEs in a manner that may be suboptimal for UAVs, in that communication with UAVs may present a unique or different set of circumstances that may not have been considered during the design of base station communication. For example, UAVs frequently operate at elevations outside of those conventional for UE operation, and often the channel path at such elevations becomes a single path along the LOS path.

In view of the foregoing, a need exists to adapt some communication to fit the properties and characteristics of UAV communication that is unique or different from those of terrestrial UEs in wireless and access networks. The present disclosure provides various techniques and solutions that relate to beamformed communication by a UE implemented as a UAV. In particular, the present disclosure describes signaling between a base station and a UAV that may be used for beam management. Some of the various concepts and aspects may increase signaling strength and reliability between the UAV and the base station in such a manner that error rates, erasures, missed packets, and the like may be reduced. In addition, interference to other UEs or base stations caused by the UAV may be reduced.

In an aspect of the disclosure, a method, a computer-readable medium, and an apparatus are provided. The apparatus may be configured to communicate at least one pilot signal with another apparatus according to a first configuration, at least one of a lower frequency density or a higher time density being indicated by the first configuration than a second configuration for a type of pilot signal that includes the at least one pilot signal. The apparatus may be further configured to communicate with the other apparatus based on the at least one pilot signal.

In another aspect of the disclosure, a method, a computer-readable medium, and an apparatus are provided. The apparatus may be a UAV configured to receive, from a base station, spatial relationship information or transmission configuration indicator (TCI) state information corresponding to a directional beam at the UE for communication on a channel. The apparatus may be further configured to apply the directional beam for communication with the base station on another channel in a sub-6 gigahertz (GHz) frequency band.

In another aspect of the disclosure, a method, a computer-readable medium, and an apparatus are provided. The apparatus may be a UAV configured to receive, from a UE, a set of pilot signals respectively corresponding to a set of directional beams of the UE in a directional beam sweep associated with UAVs. The apparatus may be further configured to transmit information indicating a selected one of the set of directional beams based on receiving the set of pilot signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of downlink channels within a subframe, in accordance with various aspects of the present disclosure.

FIG. 2C is a diagram illustrating an example of a second frame, in accordance with various aspects of the present disclosure.

FIG. 2D is a diagram illustrating an example of uplink channels within a subframe, in accordance with various aspects of the present disclosure.

DETAILED DESCRIPTION

Figure 1:
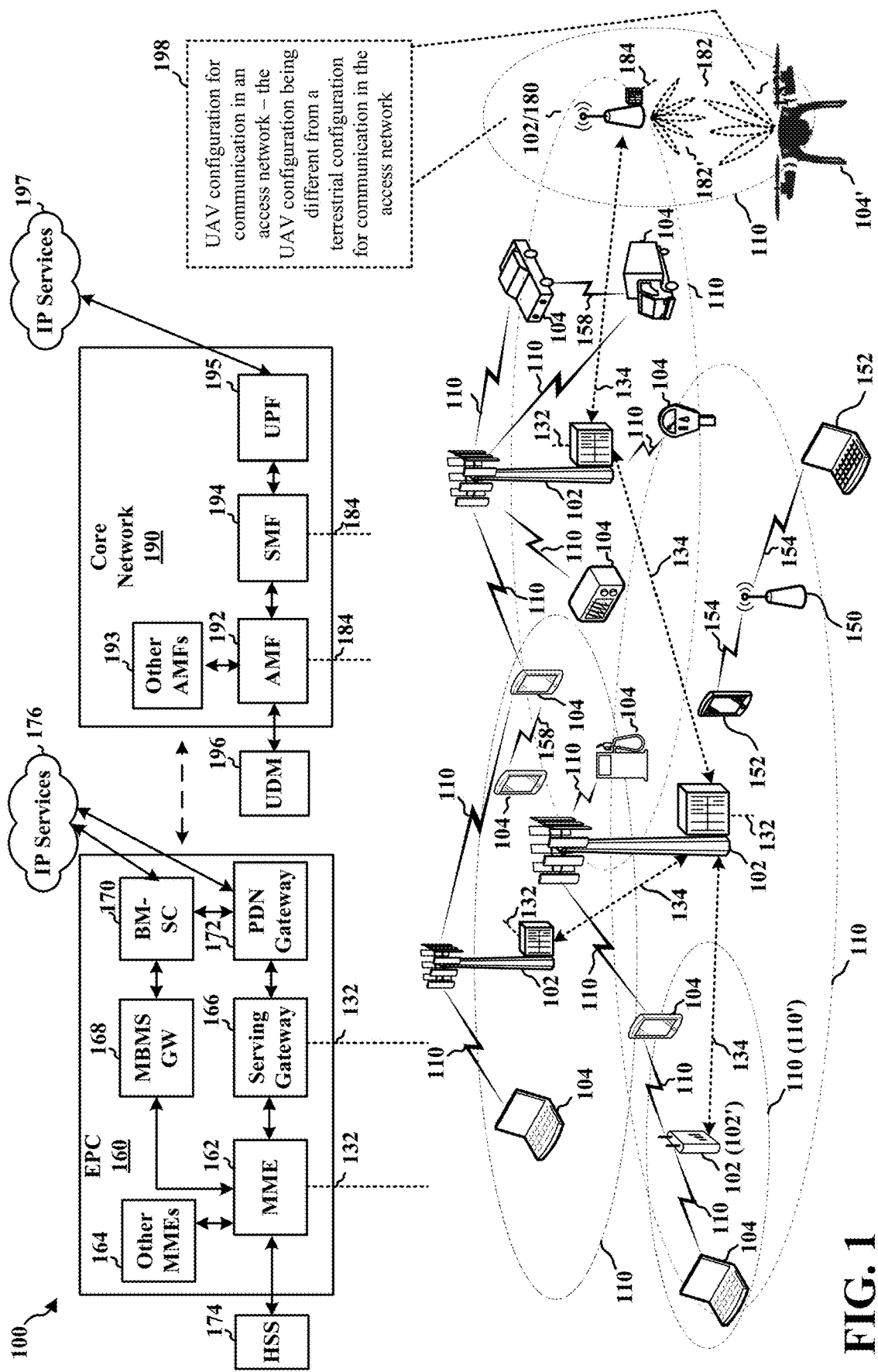
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, computer-executable code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or computer-executable code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer-executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR), which may be collectively referred to as Next Generation radio access network (RAN) (NG-RAN), may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, Multimedia Broadcast Multicast Service (MBMS), subscriber and equipment trace, RAN information management (RIM), paging, positioning, and delivery of warning messages.

In some aspects, the base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless. At least some of the base stations 102 may be configured for integrated access and backhaul (IAB). Accordingly, such base stations may wirelessly communicate with other such base stations. For example, at least some of the base stations 102 configured for IAB may have a split architecture that includes at least one of a central unit (CU), a distributed unit (DU), a radio unit (RU), a remote radio head (RRH), and/or a remote unit, some or all of which may be collocated or distributed and/or may communicate with one another. In some configurations of such a split architecture, the CU may implement some or all functionality of a radio resource control (RRC) layer, whereas the DU may implement some or all of the functionality of an radio link control (RLC) layer.

Illustratively, some of the base stations 102 configured for IAB may communicate through a respective CU with a DU of an IAB donor node or other parent IAB node (e.g., a base station), further, may communicate through a respective DU with child IAB nodes (e.g., other base stations) and/or one or more of the UEs 104. One or more of the base stations 102 configured for IAB may be an IAB donor connected through a CU with at least one of the EPC 160 and/or the core network 190. In so doing, the base station(s) 102 operating as an IAB donor(s) may provide a link to the one of the EPC 160 and/or the core network 190 for other IAB nodes, which may be directly or indirectly (e.g., separated from an IAB donor by more than one hop) and/or one or more of the UEs 104, both of which may have communicate with a DU(s) of the IAB donor(s). In some additional aspects, one or more of the base stations 102 may be configured with connectivity in an open RAN (ORAN) and/or a virtualized RAN (VRAN), which may be enabled through at least one respective CU, DU, RU, RRH, and/or remote unit.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (or UL, and also referred to as reverse link) transmissions from a UE 104 to a base station 102 and/or downlink (or DL, and also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers.

The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to downlink and uplink (e.g., more or fewer carriers may be allocated for downlink than for uplink). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the downlink/uplink WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (or "mmWave" or simply "mmW") band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a Packet Switch (PS) Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The present disclosure describes various concepts and aspects in the context of unmanned aerial vehicles (UAVs). In the present context, a UAV may include any aerial vehicle or other apparatus that is configured for aerial travel without a collocated human pilot (e.g., aerials vehicles without pilots in cockpits). Therefore, a UAV according to the present disclosure includes aerial vehicles that are remotely controlled, such as by a remotely located human operator as with drones, as well as aerial vehicles capable of autonomous flight, such as with a processor executing instructions for flight in the absence of signaling being received to control the flight.

Referring again to FIG. 1, in certain aspects, a UE 104 may be implemented at a unmanned aerial vehicle (UAV) 104' (hereinafter, referred to as "UAV"). Such an implementation may introduce a new set of issues that may not be as pronounced (or may be absent) from terrestrially implemented UEs. In view of inherent differences between these two classes of UEs, signal design and communication for terrestrial UEs may be suboptimal for UAVs.

Accordingly, the UAV 104' and the base station 102/180 may communicate according to a UAV configuration 198 of signaling that is different from the signaling configuration used by the base station 102/180 and terrestrial UEs (e.g., a UE 104). For example, in some aspects of the present disclosure, one of the UAV 104' or the base station 102/180 may communicate at least one pilot signal with the other of the UAV 104' or the base station 102/180' according to the UAV configuration 198, with at least one of a larger frequency selectivity or a smaller time density being indicated by the UAV configuration 198 than the terrestrial configuration for a type of pilot signal that includes the at least one pilot signal. The UAV 104' and the base station 102/180 may then communicate based on the at least one pilot signal, which may be used for channel estimation, beam management, and the like.

In some other aspects of the present disclosure, the UAV configuration 198 may include a configuration for beam management at the UAV 104'. For example, the UAV 104' may perform a directional beam sweep across multiple transmit directions (e.g., similar to the receive directions 182", supra) according to the UAV configuration 198. The UAV 104' may receive, from the base station 102/180, information identifying a signal transmitted to the base station 102/180 via a directional beam according to the UAV configuration 198, and then the UAV 104' may apply that directional beam for communication with the base station 102/180 based on the information identifying the signal.

Correspondingly, the base station 102/180 may receive, from the UAV 104', a set of pilot signals respectively corresponding to a set of directional beams of the UAV in a directional sweep according to the UAV configuration 198. The base station 102/180 may then transmit information indicating a selected one of the set of directional beams based on receiving the set of pilot signals.

Although the present disclosure may focus on 5G NR, the concepts and various aspects described herein may be applicable to other similar areas, such as LTE, LTE-Advanced (LTE-A), Code Division Multiple Access (CDMA), Global System for Mobile communications (GSM), or other wireless/radio access technologies.

FIG. 2A is a diagram 200 illustrating an example of a first subframe within a 5G NR frame structure. FIG. 2B is a diagram 230 illustrating an example of downlink channels within a 5G NR subframe. FIG. 2C is a diagram 250 illustrating an example of a second subframe within a 5G NR frame structure. FIG. 2D is a diagram 280 illustrating an example of uplink channels within a 5G NR subframe. The 5G NR frame structure may feature a frequency division duplex (FDD) configuration in which for a particular set of subcarriers (carrier system bandwidth), subframes within the set of subcarriers are dedicated for either downlink or uplink, or may be time division duplexed (TDD) in which for a particular set of subcarriers (carrier system bandwidth), subframes within the set of subcarriers are dedicated for both downlink and uplink. In the examples provided by FIGS. 2A, 2C, the 5G NR frame structure is assumed to be TDD, with subframe 4 being configured with slot format 28 (with mostly downlink), where D is downlink, U is uplink, and F is flexible for use between downlink/uplink, and subframe 3 being configured with slot format 34 (with mostly uplink). While subframes 3, 4 are shown with slot formats 34, 28, respectively, any particular subframe may be configured with any of the various available slot formats 0-61. Slot formats 0, 1 are all downlink, uplink, respectively. Other slot formats 2-61 include a mix of downlink, uplink, and flexible symbols. UEs are configured with the slot format (dynamically through downlink control information (DCI), or semi-statically/statically through RRC signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on downlink may be cyclic prefix (CP) orthogonal frequency-division multiplexing (OFDM) (CP-OFDM) symbols. The symbols on uplink may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 microseconds (μs). Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry at least one pilot and/or reference signal (RS) for the UE. In some configurations, an RS may include at least one demodulation RS (DM-RS) (indicated as $R_x$ for one particular configuration, where 100x is the port number, but other DM-RS configurations are possible) and/or at least one channel state information (CSI) RS (CSI-RS) for channel estimation at the UE. In some other configurations, an RS may additionally or alternatively include at least one beam measurement (or management) RS (BRS), at least one beam refinement RS (BRRS), and/or at least one phase tracking RS (PT-RS).

FIG. 2B illustrates an example of various downlink channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the uplink.

FIG. 2D illustrates an example of various uplink channels within a subframe of a frame. The PUCCH may be located as indicated in one configuration. The PUCCH carries uplink control information (UCI), such as scheduling requests (SRs), a channel quality indicator (CQI), a precoding matrix indicator (PMI), a rank indicator (RI), and hybrid automatic repeat request (HARD) acknowledgement (ACK)/non-acknowledgement (NACK) feedback. The PUSCH carries data, and may additionally be used to carry a buffer status report (BSR), a power headroom report (PHR), and/or UCI.

Figure 3:
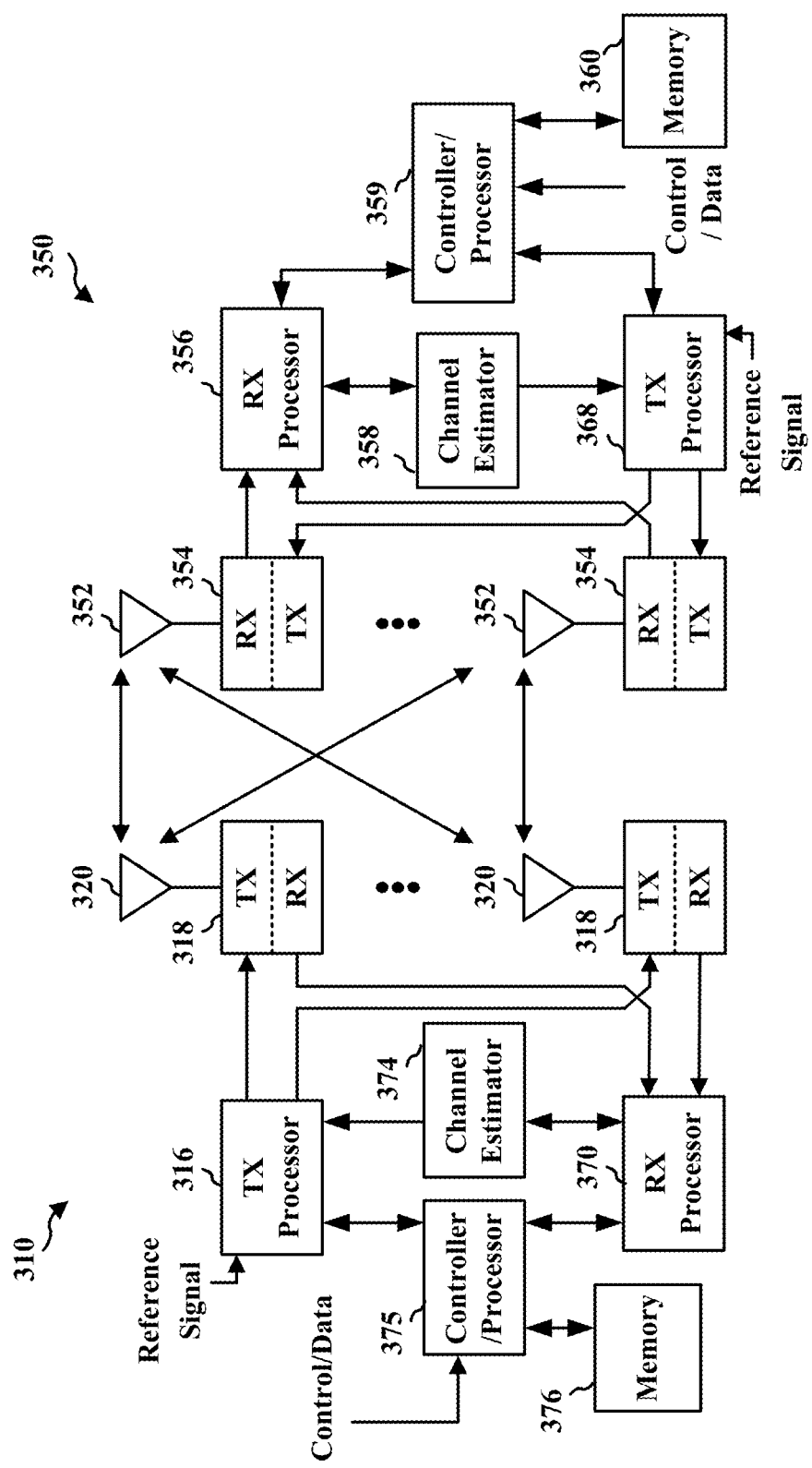
FIG. 3 is a diagram illustrating an example of a base station and user equipment (UE) in an access network.

FIG. 3 is a block diagram of a base station 310 in communication with a UE 350 in an access network. In the downlink, IP packets from the EPC 160 may be provided to a controller/processor 375. The controller/processor 375 implements Layer 2 (L2) and Layer 3 (L3) functionality. L3 includes an RRC layer, and L2 includes a service data adaptation protocol (SDAP) layer, a packet data convergence protocol (PDCP) layer, an RLC layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement Layer 1 (L1) functionality associated with various signal processing functions. L1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement L1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements L3 and L2 functionality.

The controller/processor 359 can be associated with a memory 360 that stores program codes and data. The memory 360 may be referred to as a computer-readable medium. In the uplink, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the downlink transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The uplink transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the uplink, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some aspects, at least one of the TX processor 368, the RX processor 356, and the controller/processor 359 may be configured to perform aspects in connection with the UAV configuration 198 of FIG. 1.

In some other aspects, at least one of the TX processor 316, the RX processor 370, and the controller/processor 375 may be configured to perform aspects in connection with the UAV configuration 198 of FIG. 1.

Referring to FIGS. 4 through 13, various aspects related to communication by UAVs is described. UAVs may be configured to communicate in some or all of a cellular spectrum, for example, including F1 and FR2 of 5G NR. Accordingly, UAVs may access and connect with a base station, e.g., for some functionality or other connectivity. The differences between terrestrial UEs and UAVs, at least with respect to characteristics and conventional operating environments, may prohibit use of a common configuration for communication.

For example, UAVs may communicate using directional beamforming in which channels between UAVSs and base stations are substantially impacted by the line of sight (LOS) path. In particular, signal propagation to and from a UAV is unlikely to be aided by multipath components, as there may be generally fewer (if any) multipath components proximate to UAVs in environments suitable for aerial operation. In addition, UAVs may cause interference over a wider area than terrestrial UEs, e.g., when communicating without beamforming.

As described herein, UAVs may be configured to communicate using directional beamforming. However, UAVs may change flight direction and speed relatively rapidly. Furthermore, the dynamic and free movement of UAVs in 3D space and other flight dynamics (such as direction, speed, roll, pitch, yaw, etc.) may result in a rapid degradation of beam gain (e.g., as there may be few, if any, multipath components). Thus, accurately predicting the channel on which the UAV may communicate with the base station may difficult, as such channel predictions and channel estimations may be stale when intended to be used.

In addition, beamformed communication be tailored to UAV considerations. In particular, UAVs and base stations may communicate according to a signaling configuration (e.g., for beam management) adapted to certain factors that may be unique to UAV communication or different from terrestrial communication. Aspects of such configurations provided herein may increase the strength and reliability of signals carrying information between the UAV and the base station, which may reduce erasures, error rates, missed packets, and the like. In so doing, interference caused by UAVs to terrestrial UEs or other base stations may be reduced.

Figure 4:
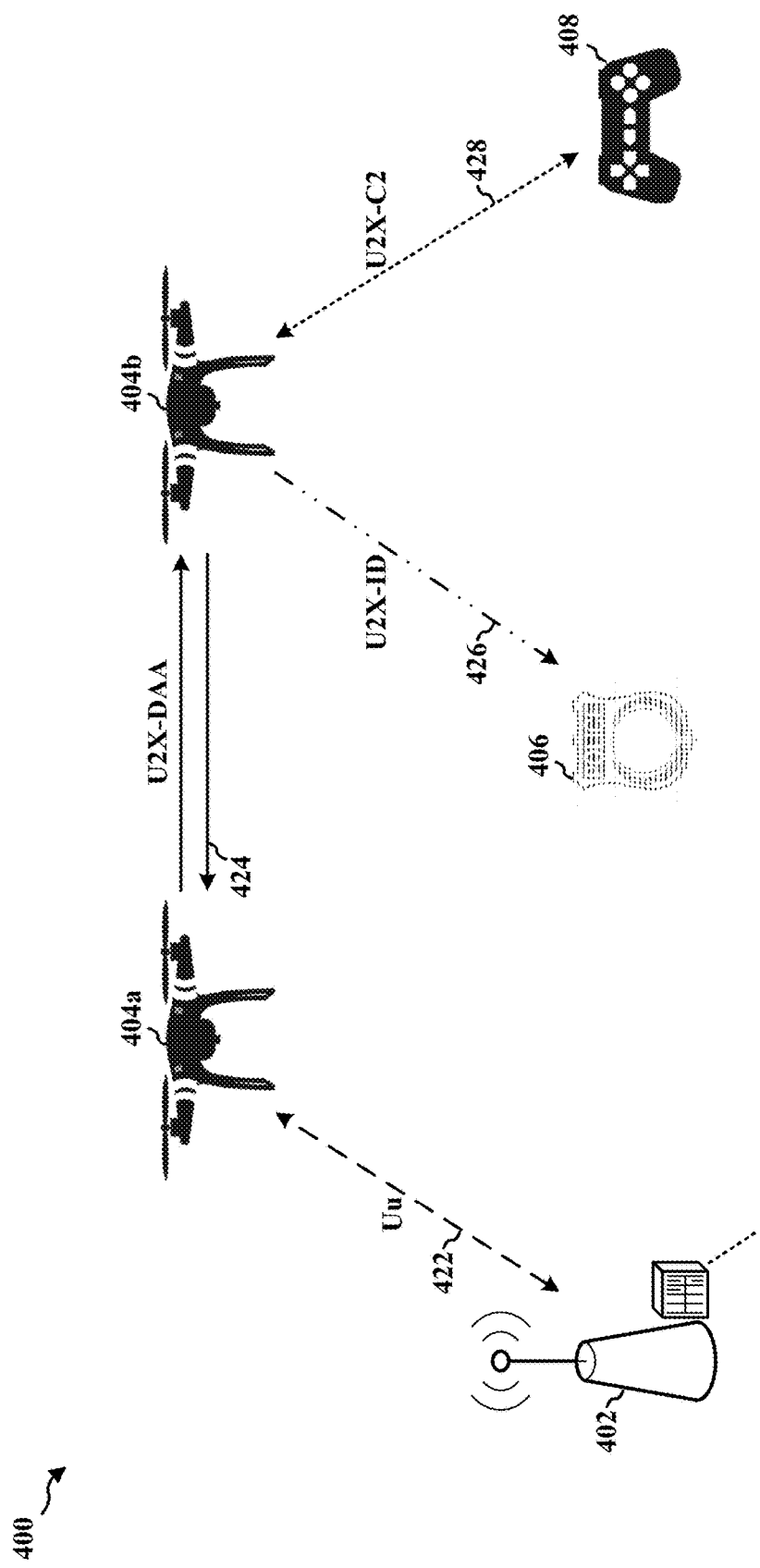
FIG. 4 is a diagram illustrating an example of a wireless communications environment in which an unmanned aerial vehicles (UAV) may communicate.

With reference to FIG. 4, a diagram illustrates an example of a wireless communications environment 400 in which UAVs 404a-b may communicate. Some UEs may be implemented at UAVs, and therefore, UAVs may share the frequency spectrum of an access network with terrestrial UEs. Thus, in addition to UEs and base stations, one or both of the UAVs 404a-b may communicate in a sub-6 GHz frequency band and/or a mmW band.

Illustratively, communication by the UAVs 404a-b may be coextensive with that of terrestrial UEs and base stations in FR1 and/or FR2 assigned for a 5G NR RAN. However, the UAVs 404a-b may be operable to communicate in an LTE RAN in some other aspects, in addition or alternative to the 5G RAN. In some aspects, some UAVs, such as the first UAV 404a, may be configured to communicate with base stations, such as the base station 402. The base station 402 may provide the first UAV with enable network registration, access and mobility, and other such connectivity similar to that of terrestrial UEs.

In some aspects, the first UAV 404a may communicate with the base station 402 on an air interface, and specifically, the Uu interface when in a 5G NR RAN. On the interface, the first UAV 404a may obtain connectivity for receiving remote controller instructions, receiving various applications, transmitting video and image data, and so forth. In some aspects, some command and control (C2) functionality may be provided through the base station 402. Potentially, the first UAV 404a may also act as a relay point, e.g., to the second UAV 404b or a terrestrial UE.

The UAVs 404a-b may be configured to communicate on a direct channel, although communication between UAVs may additionally or alternatively be routed through a base station. The UAVs 404a-b may communicate on a PC5 interface according to a UAV-to-everything (U2X) technology, which may be adapted to meet use cases common to UAV communication and operation. Specifically, U2X communication may include detect and avoid (DAA) (U2X-DAA) technology, e.g., according to which the UAVs 404a-b may communicate some location and alert information as a preventative measure against collisions between the UAVs 404a-b. In some aspects, the UAVs 404a-b may communicate on U2X-DAA links 424, which may be unidirectional and may carry some safety, mission, or other critical information. In some other aspects, one or both of the UAVs 404a-b may communicate using broadcast technology.

Furthermore, the UAVs 404a-b may communicate with other UEs, such as terrestrial UEs for regulatory authority 406 and/or for remote control 408. In some access networks, the UAVs 404a-b may communicate with the regulatory authority 406 and the remote control 408 over the PC5 interface. However, the UAVs 404a-b may also communicate over another interface. For example, the UAVs 404a-b may communicate with the regulatory authority 406 over a broadcast air interface and/or the UAVs 404a-b may communicate with the remote control 408 over a bidirectional air interface.

In some instances, the UAVs 404a-b may be subject to the regulation by a transportation authority, such as the Federal Aviation Administration (FAA) in the United States, or another such governmentally implemented authority. Compliance with such regulation may include reporting a remote identification (ID). In some aspects, the UAVs 404a-b may implement an ID technology with U2X. Illustratively, the second UAV 404b may establish a U2X-ID link 426, which may be a unidirectional link on which to report identification, location, route, and other information falling within the purview of the regulatory authority 406.

As the UAVs 404a-b are by definition unmanned, instructions for aerial movements are generally provided from a remote control. For example, the remote control 408 may provide the second UAV 404b with instructions, control, and other critical information, e.g., on a U2X-C2 link 428. The U2X-C2 link 428 may be bidirectional and may serve to carry non-payload information similar or the same as the aforementioned, as well as reporting feedback, status, location, and other information from the second UAV 404b to the remote control 408. Potentially, the U2X-C2 link 428 may be operable over relatively great distances, e.g., up to 10 kilometers.

Figure 5:
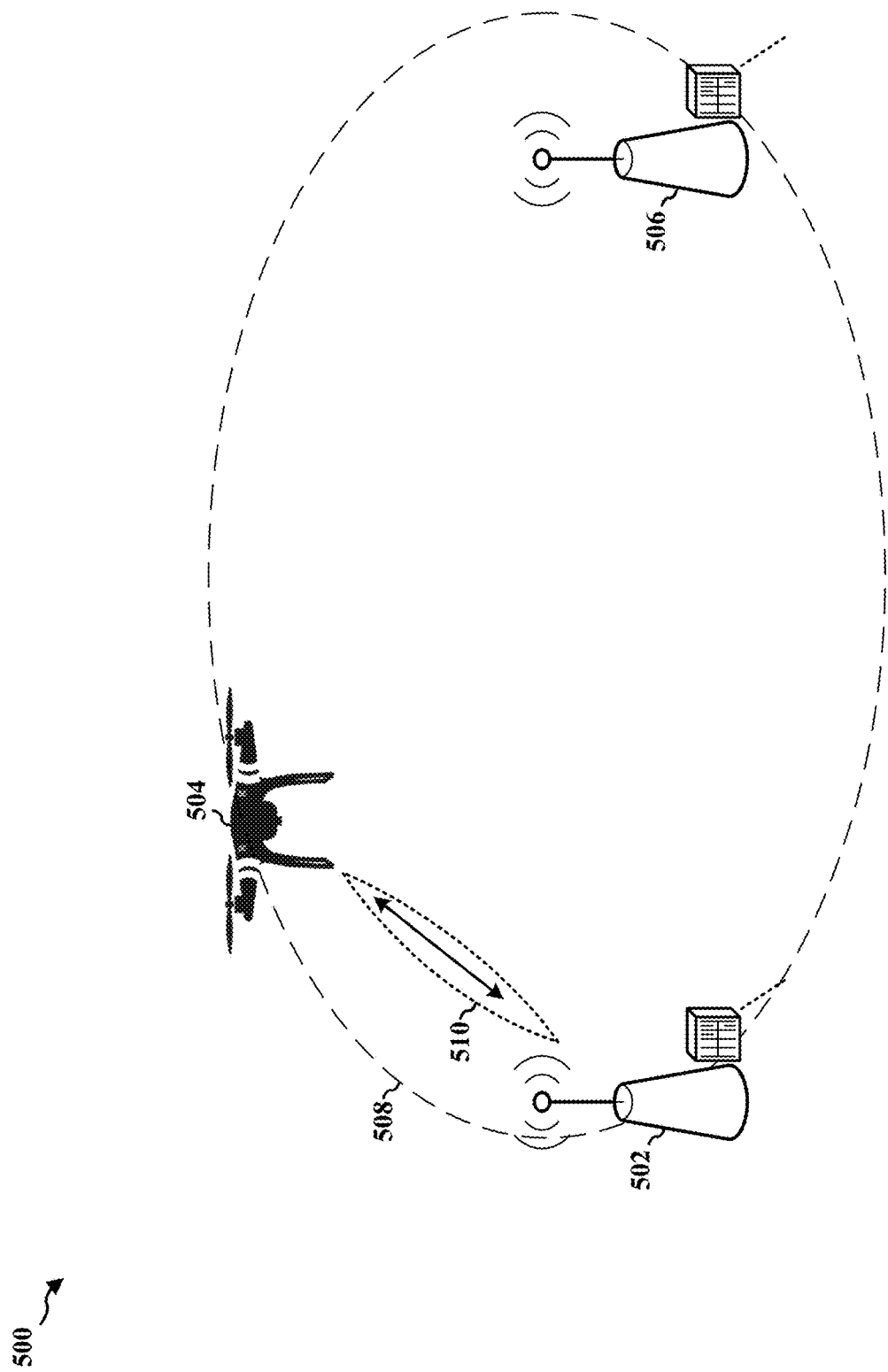
FIG. 5 is a diagram illustrating another example of a wireless communications environment in which a UAV may communicate.

FIG. 5 is a diagram illustrating another example of a wireless communications environment 500 in which a UAV 504 may communicate. As described with respect to FIG. 4, supra, a UAV, such as the UAV 504, may communicate over an air interface with a base station, such as the serving base station 502. However, the aerial movement, maneuverability, and other such characteristics typical of UAVs may affect channel path to such a degree that properties and other conclusions made for a terrestrial UE channel path cannot be applied to the UAV channel path. For example, a UAV may be any unmanned aerial system (UAS) that is capable of aerial movement, and therefore, UE mobility, line-of-sight (LOS), and some other factors may have a greater effect on communication with UAVs relative to terrestrial UEs.

In particular, UAV channel path may be dominated by the LOS path, which is often not the case for terrestrial UEs. Generally, a channel on which to communicate with a terrestrial UE may be assumed to be multipath, as terrestrial UEs are often in an environment having multipath components (e.g., automobiles, windows, and so forth) which may provide non-LOS paths for signaling to or from the terrestrial UEs. A multipath channel cannot be assumed for UAVs, however, as multipath components may be sparsely located in the wireless environments in which UAVs frequently operate.

Signaling with a UAV on a primarily LOS channel path may be less robust and reliable than on a multipath channel, e.g., as susceptibility to interference and signal loss from unaccounted for or unanticipated UAV movements. One approach to addressing single path communication with the UAV may include use of an omnidirectional antenna to communicate on a wide beam 508. However, implementing an omnidirectional antenna may be suitable for terrestrial UEs, but a wide beam 508 for UAV communication may appreciably increase uplink interference to co-channel terrestrial UEs in direct proportion to signal strength and coverage, e.g., when signals propagate down from UAVs at elevations higher than that at which terrestrial UEs are assumed to be operating. Such interference from UAV signaling on the wide beam 508 may be carried well outside of the serving cell of the UAV. Further, the UAV may still suffer a greater amount of downlink interference from at least one neighboring (non-serving) co-channel base station 506.

In view of such considerations, the UAV 504 of the present disclosure may be configured to utilize directional beamforming for some or all communication. While some RATs, such as a 5G NR RAT, may designate the use of beamforming for mmW (or FR2) communication, RATs like LTE and 5G NR do not require or otherwise designate spatial beamforming for transmission and/or reception by terrestrial UAVs. In contrast to UEs that use a wide or omnidirectional beam, the UAV 504 may be configured to use directional beamforming in both a mmW band and a sub-6 GHz band, such as FR2 and FR1, respectively, assigned for 5G NR operations. Potentially, the UAV 504 may be equipped with multiple antenna panels that can be used in FR1, e.g., to improve signal reception when the UAV 504 changes direction or orientation. Potentially, the UAV 504 may report, to the serving base station 502, some information indicative of signal strength and channel quality for individual panels. Each panel about which the UAV reports may be separately identified, and so, the base station 502 may configure communication with the UAV 504 according to the signal strengths and channel qualities of multiple panels.

Using directional beamforming, the UAV 504 may generate a directional beam 510 on which to communicate, e.g., with the base station 502. In some aspects, some the UAV 504 may use the directional beam 510, or may use properties similar to that of the directional beam 510, for both transmission (e.g., uplink) and reception (e.g., downlink). Thus, the directional beam 510 may be referred to as a TX/RX beam.

Unlike multipath channels with terrestrial UEs in which phase, fast fading channel, and other differences with uplink-downlink FDD prevent channel or beam reciprocity, the single-path LOS channel may maintain channel reciprocity in one or more areas sufficient to apply some spatial filtering or other properties (e.g., direction or antenna polarization) to both TX and RX beams.

However, support for such a TX/RX beam may be hindered by frequent and abrupt changes at the UAV to elevation, speed, direction, orientation, and the like. Such changes may involve a requisite adjustment of antenna polarization (or direction) to find and select a satisfactory (or best) TX/RX beam. As scenarios involving UAV communication may have been largely overlooked and/or minimized in the past, beam management procedures for terrestrial UEs may not have the desired effects with UAVs. Moreover, beam management procedures may be undefined or rudimentary for sub-6 GHz, as such procedures are principally designed with mmW bands in mind.

Figure 6:
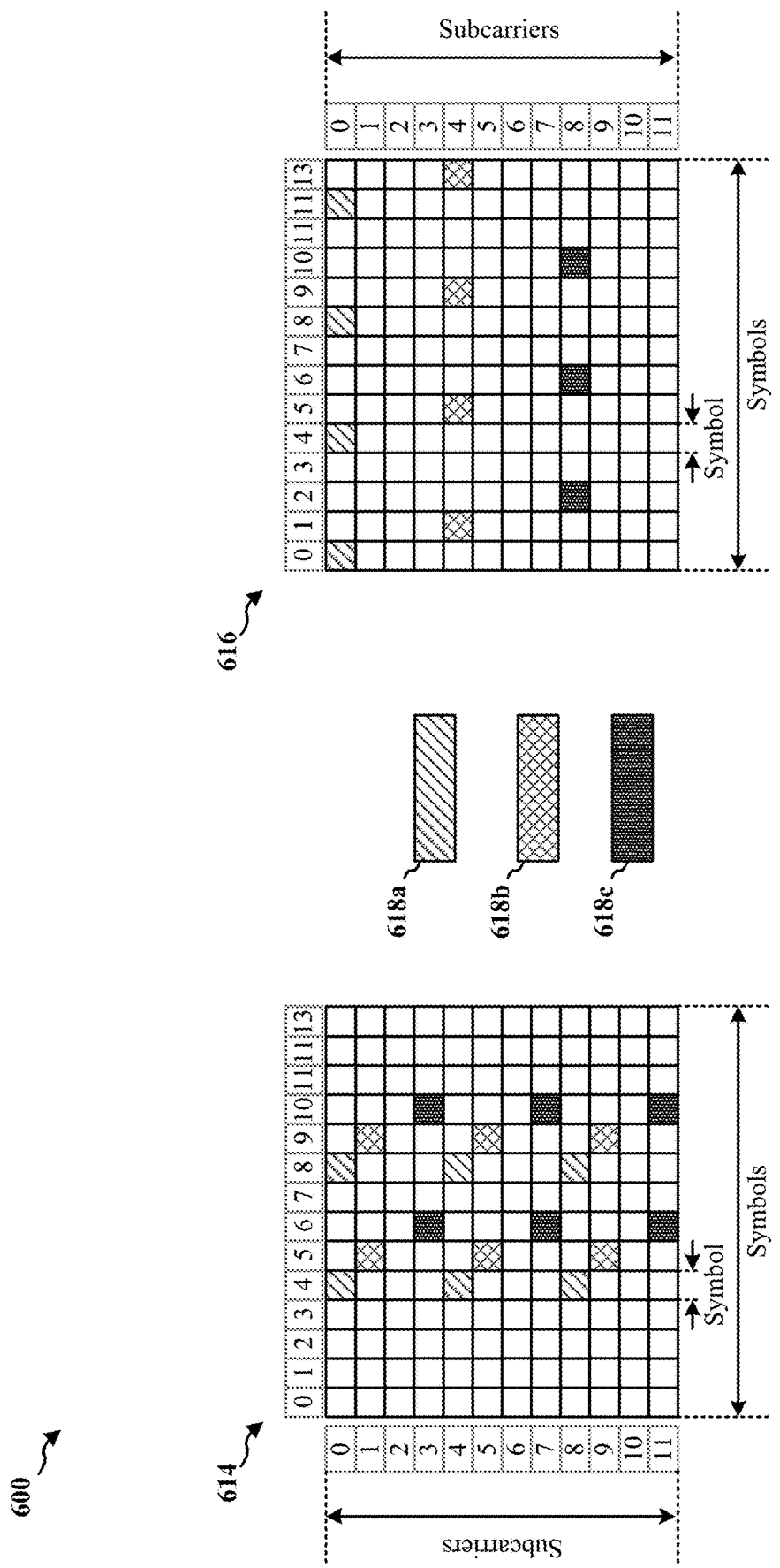
FIG. 6 is a diagram illustrating examples of configurations of pilot signals on resources for beam management with UAVs.
Figure 7A:
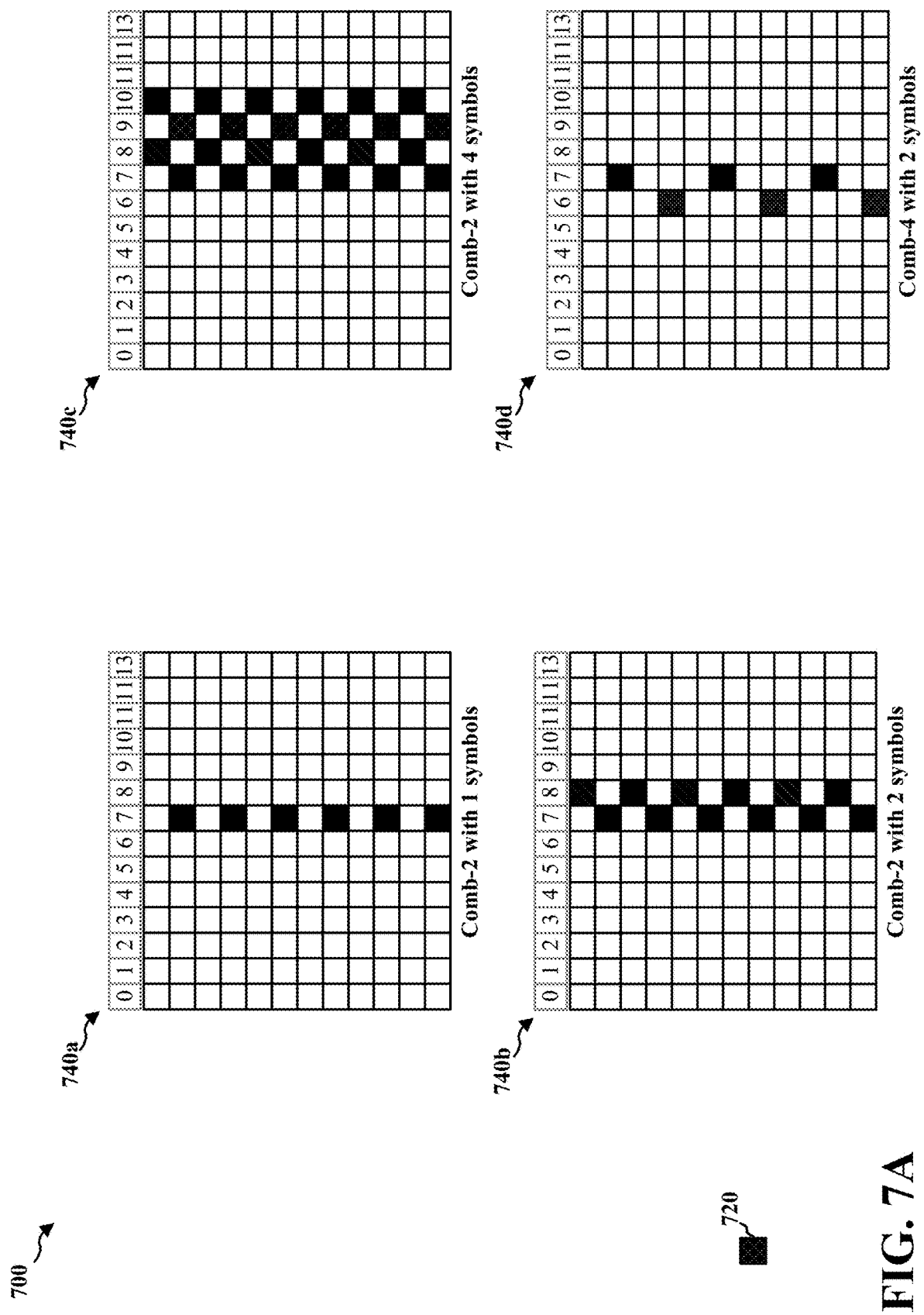
FIGS. 7A and 7B are diagrams illustrating other examples of mappings of pilot signals on resources for beam management with UAVs.
Figure 7B:
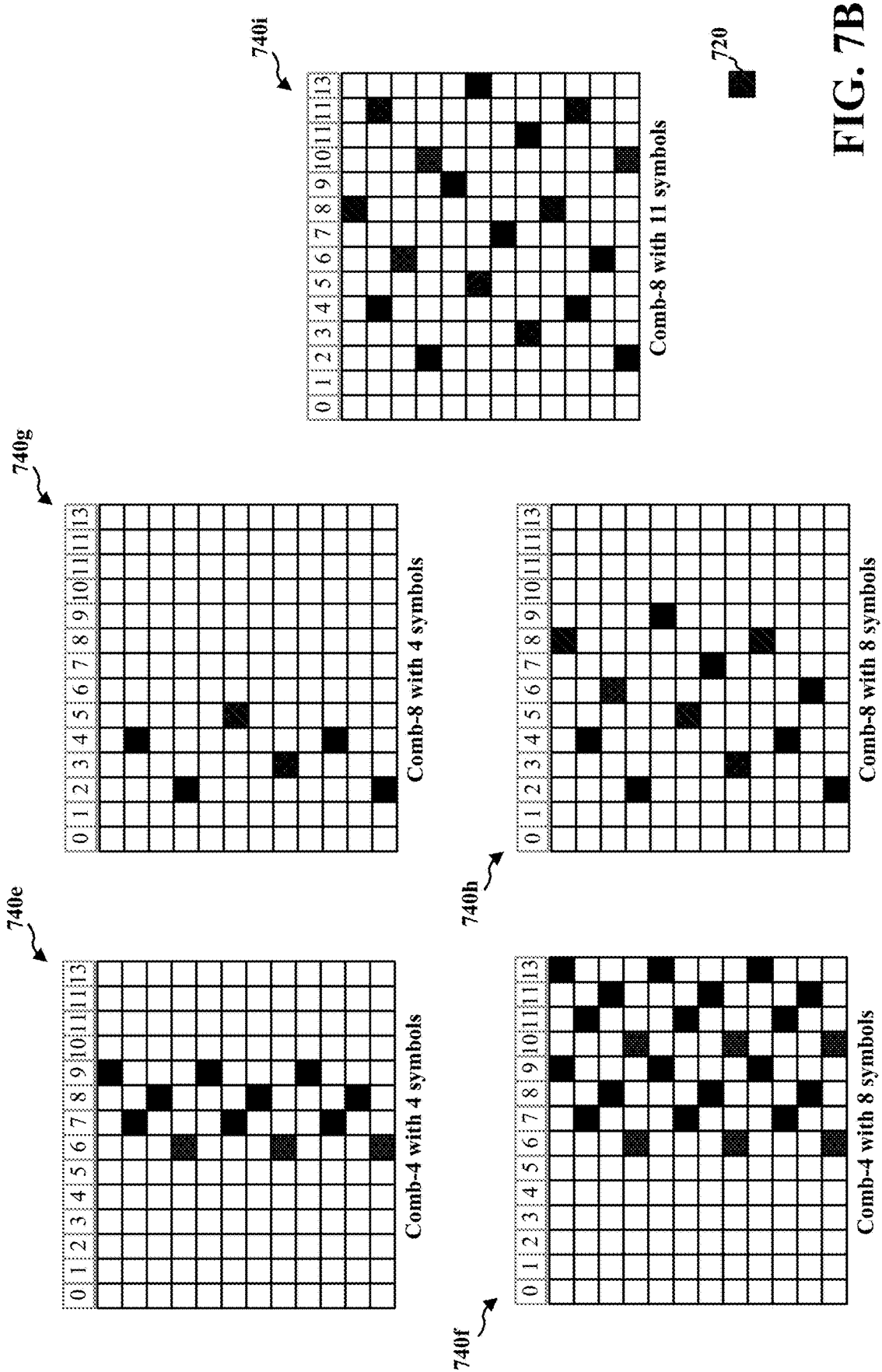

Thus, the signaling configurations of UAVs and base stations may be unsuitable for management of the beams at a UAV. FIGS. 6 and 7A and 7B illustrate signaling configurations for UAVs, which may improve upon similar signaling configurations for terrestrial UEs, e.g., in terms of interference reduction, latency, network congestion, and/or other factor(s). The signaling configurations described herein may be applied to beam management of UAV beams, either autonomously (by the UE itself) or through base station control.

Still with reference to FIG. 5, some of the various concepts and aspects described herein may be applicable to the elevation of a UAV. For example, a elevational threshold may be specified at which communication according to a UAV configuration may be preferable to a terrestrial configuration. Therefore, a UAV should use the UAV configuration when the UAV has reached or is within a certain range above or below that elevational range. Apart from instances in which the UAV is above that elevational range, however, the UAV may be free to use the terrestrial configuration.

Illustratively, the UAV 504 may be configured to determine whether the UAV 504 is at an elevation that satisfies the elevational threshold. In some aspects, the UAV 504 may autonomously determine the elevation, such as by using positioning and/or location circuitry at the UAV 504. For example, the UAV 504 may determine the elevation by measuring or estimating the distance between the UAV 504 and a point on the ground directly or approximately below the UAV 504. In some other aspects, the UAV 504 may be configured to determine the elevation by receiving information from the base station 502 that indicates the elevation of the UAV 504.

In some aspects, the UAV 504 may compare the elevation with the elevational threshold and, based on the comparison, determine whether the elevational threshold is satisfied. If the elevation does not satisfy (e.g., does not meet) the elevational threshold, then the UAV 504 may continue to use the terrestrial configuration. If the elevation satisfies (e.g., meets or exceeds) the elevational threshold, then the UAV 504 may transmit information indicating at least one of a preference to use the UAV configuration or an indication of the elevation of the UAV 504. The base station 502 may then determine whether to use the UVA configuration for communication with the UAV 504. If the base station 502 determines to use the UAV configuration, then the base station 502 may signal the UAV with an intention to do so.

In some other aspects, the base station 502 may determine the elevation the UAV 504, such as by receiving positioning and/or location information from the UAV 504. For example, the base station 502 may determine the elevation by measuring or estimating the distance between the UAV 504 and a point on the ground directly or approximately below the UAV 504. In some other aspects, the base station 502 may determine the elevation of the UAV 504 by receiving information from the another network entity different from the UAV 504 and the base station 502 that indicates the elevation of the UAV 504.

In some aspects, the base station 502 may compare the elevation with the elevational threshold and, based on the comparison, determine whether the elevational threshold is satisfied for the UAV 504. If the elevation does not satisfy (e.g., does not meet) the elevational threshold, then the base station 502 may continue to use the terrestrial configuration for communication with the UAV 504. If the elevation satisfies (e.g., meets or exceeds) the elevational threshold, then the base station 502 may transmit information indicating at least one of a preference to use the UAV configuration or an indication of the elevation to the UAV 504. For example, the base station 502 may transmit instructions to the UAV 504 to use the UVA configuration for communication with the UAV 504.

When the UAV configuration is determined to be used, the base station 502 and the UAV 504 may apply the UAV configuration, which may include some signaling and content adapted for UAVs and/or the wireless communications environments in which UAVs are designed to operate. Such an approach may also support backward compatibility and legacy devices.

FIG. 6 is a diagram illustrating examples of configurations 614, 616 of pilot signals 618a-c on resources for beam management with UAVs. The pilot signals 618a-c may be any signal, whether single frequency or otherwise, that may be used as a reference signal, control signal, synchronization signal, or other non-data signal from which a UAV can derive some information applicable to beam management.

According to various implementations in some RANs, the pilot signals 618a-c may be or may include CSI-RSs and/or tracking reference signals (TRSs), which may be or may be similar to a one port CSI-RS. In the illustrated example, three pilot signals 618a-c are transmitted by the base station; however, more or fewer pilot signals may be transmitted in different aspects.

Referring to the terrestrial configuration 614, a signaling configuration that is used by some base stations and terrestrial UEs for the pilot signals 618a-c is illustrated. The terrestrial configuration 614 may be used for time and frequency tracking by a terrestrial UE. For terrestrial UEs, the configuration 614 may be applied with pilot signals in sub-6 GHz bands, such as FR1, although potentially the same or similar configuration may be applied in mmW bands, such as FR2.

The terrestrial configuration 614 may designate a pattern for the pilot signals 618a-c defining the REs carrying each signal. In some aspects, such as with FR2, some pilot signals may be limited to one or two slots, e.g., having a length of fourteen symbols. In the illustrated example of the terrestrial configuration 614, a pattern with a frequency density Sf=4, meaning a pilot signal on one RE per four subcarriers, and a time density St=4, meaning a pilot signal on one RE per four symbols per one slot. In the terrestrial configuration 614, the pattern may specify the symbol pairs in a slot l∈{4, 8}.

In some other aspects, pilot signals of the same types as the pilot signals 618a-c may be configured with a different pattern specifying, e.g., specify a different frequency density, a different time density, and/or different symbol pairs in a slot 1. For example, patterns for TRSs in FR1 of 5G NR may limit the symbol pairs in a slot 1 to one of l∈{4, 8}, l∈{5, 9}, and l∈{6, 10}, although TRSs in FR2 may be allowed on all ten possible symbol pairs having a separation of four symbols between the REs of the pair.

Referring to the UAV configuration 616, the illustrated TRSs may be used for channel measurement (and beam measurement, specifically). For example, a base station may repeatedly transmit pilot signals 618a-c for beam selection, e.g., of a TX/RX beam by a UAV. Rather than limiting the pilot signals 618a-c to one or two slots, the UAV configuration 616 may allow pilot signals of the type shown by the pilot signals 618a-c on one, two, three, or four slots.

Further, frequency selectivity may differ between terrestrial UEs and UAVs. For example, terrestrial UEs may experience interference, fading, and so forth that may dictate the pilot signals 618a-c be carried on more than one RE per slot. However, some or all of the factors dictating a higher density may not be as pronounced in UAV environments. At the same time, UAVs may change direction more frequently and/or with a greater speed than is common for terrestrial UEs, and therefore, increasing the number of symbols carrying pilot signals in the time domain may prevent the use of stale measurements of channels and channel variations.

Accordingly, the UAV configuration 616 may configure the pilot signals 618a-b (and those of the same type) with at least one of a lower frequency density or a higher time density than that configured by the terrestrial configuration 614. Illustratively, the UAV configuration 616 may designate a pattern with a frequency density Sf=12, meaning a pilot signal on one RE per twelve subcarriers, and a time density St=4, meaning a pilot signal on one RE per four symbols, but without limiting the number of symbols per slot.

In some aspects, a UAV configuration for some signals may allow for a frequency density Sf=8 or 12, both of which are result in a lower frequency density than the terrestrial configuration of Sf=4, and/or a time density St=1, 2, or 4 symbols, and/or 1, 2, 3, or 4 slots, which will generally lead to a higher time density than the terrestrial configuration. Specifically, the UAV configuration 616 and other such configurations for UAV signals may be applied in sub-6 GHz bands such as FR1, for example, for beam management (e.g., beam measurements) of directional beams in such a part of the spectrum bandwidth (and potentially including up to 7 GHz).

FIGS. 7 and 7B are diagrams illustrating other examples 700 of mappings 740a-i of pilot signals 720 on resources for beam management with UAVs. In the illustrated examples 700, the pilot signals 720 may be SRSs. Thus, in a terrestrial configuration, a UAV may transmit the pilot signals to sound the channel with a base station. However, the pilot signals may be leveraged for some beam management purposes, as well. For example, a UAV (e.g., the beam 510 of FIG. 5) may perform a beam sweep procedure in which the UAV sweeps through some or all of its directional beams, and transmits one of the pilot signals 720 on each. The pilot signals 720 may include information corresponding to a beam at the UAV.

A base station (e.g., the base station 502 of FIG. 5) may receive one or more of the pilot signals 720 transmitted by the UAV, and the base station 502 may calculate at least one measurement indicative of signal strength and/or channel quality respectively corresponding to each of the received pilot signals. The base station may compare the pilot signal measurements with one another, and may select one or more of the measurements. For example, the base station may select the highest or "best" measurement. Information identifying the one of the pilot signals 720 corresponding to the highest or best measurement at the UAV may then be transmitted by the base station to the UAV. For example, the information may include a resource indicator, such as a sounding reference signal (SRS) resource indicator (RI) (SRI), a transmission configuration indicator (TCI) state or other quasi-collocation (QCL) information, or another indicator an SRS transmitted on a UAV beam.

The UAV may select the beam corresponding to the signal indicated by the base station for communication with the base station. For example, the UAV may communicate on the selected beam for some or all uplink communication, such as communication on a PUCCH, in FR1, as well as FR2. In addition, due to a level of common direction or antenna polarization afforded by the single path channel, the UAV may use the same for some downlink communication as well, such as communication on a PDCCH and/or a PDSCH.

In some aspects, the performance and robustness of the beam management procedure in which the UAV transmits the pilot signals 720 may benefit from a greater number REs in each slot being assigned to carry the pilot signals 720. An SRS (or an SRS resource) may be assigned in a comb structure over subcarriers in a slot, with comb-x indicating the number x between subcarriers on which SRSs are assigned. In the terrestrial configuration, the mappings 740a-f featuring comb-2 and comb-4 structures may be used for some channel sounding purposes in FR2. The remaining mappings 740g-i may be dedicated to positioning in some RANs, such as 5G NR in FR1, or may be absent entirely.

In the UAV configuration, however, the comb-8 mappings 740g-h (and in some aspects, mappings for one or more comb values larger than eight, such as with one RE per two RBs) may be used for beam management, which may improve measurements over a larger area relative to fewer pilot signals. In some aspects, the transmission comb of pilot signals (e.g., SRSs) may be extended to a comb-12 mapping 740i for use with beam management. In still other aspects, the transmission comb of pilot signals (e.g., SRSs) for use with beam management may be extended to one or more comb values that are larger than twelve, such as comb-24, e.g., having one RE per two RBs in some cases within a wide uplink BWP. The base station can then feedback an identifier of the selected one of the pilot signals 720 to inform the UAV of a preferred beam.

Figure 8:
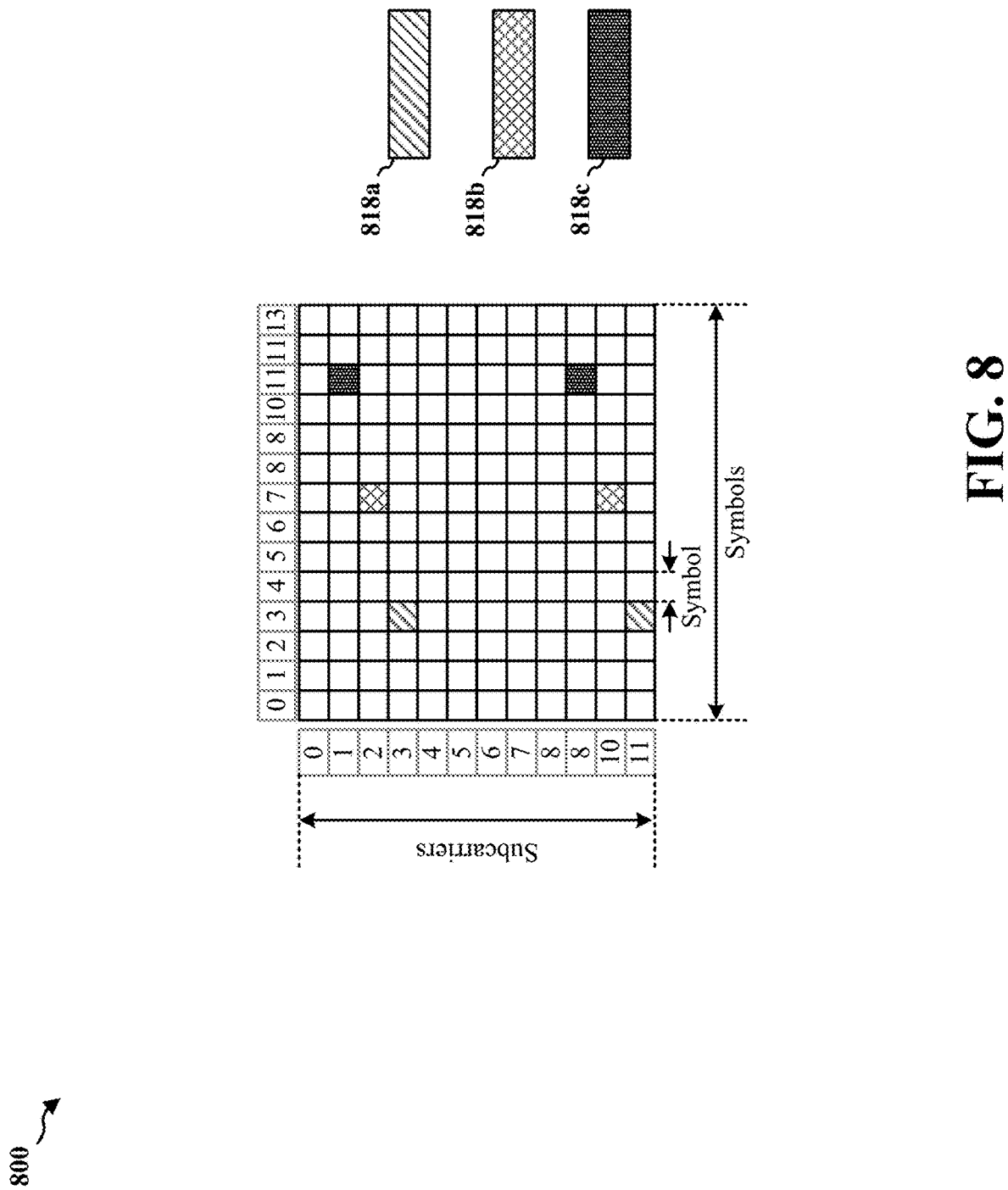
FIG. 8 is a diagram illustrating an example of a transmission comb for beam management with a UAV.

Referring to FIG. 8, a transmission comb 800 for beam management (e.g., in sub-6 GHz range) may be implemented by the UAV configuration. The transmission comb 800 may include SRSs or other pilot signals separated by eight subcarriers (e.g., comb-8). The base station may configure the UAV with multiple SRS resources, which the UAV may transmit on the transmission comb 800, with each SRS including information identifying the beam on which pilot signal is transmitted. For example, SRSs of the same symbol in the transmission comb 800 may have a common SRI 818a-c. According to the UAV configuration, when the base station receives and measures the pilot signals in the comb structure 800, the base station may provide information indicating the selected signal or beam to the UAV for application in at least one of uplink and/or downlink communication in sub-6 GHz networks.

Figure 9:
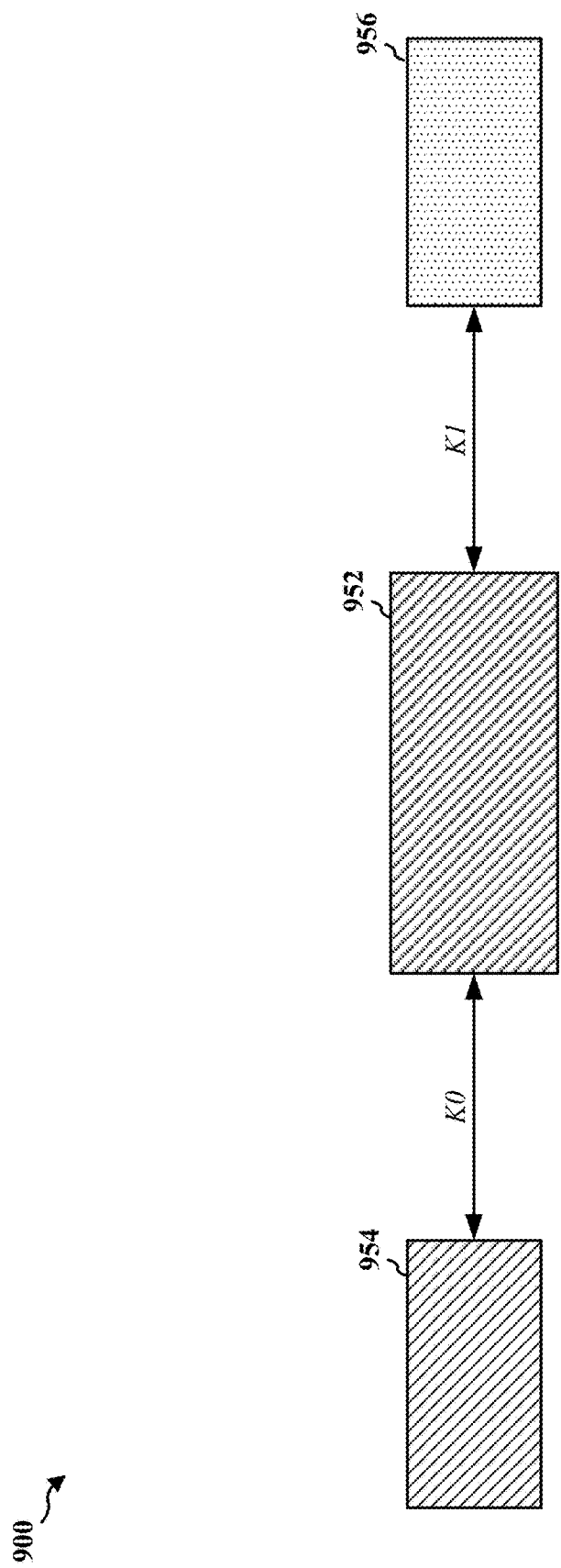
FIG. 9 is a diagram illustrating an example of channels on which a UAV may communicate with a base station.

FIG. 9 is a diagram illustrating an example 900 of channels 952, 954, 956 on which a UAV may communicate with a base station. A first channel 952 may be a downlink data channel, such as the PDSCH. A second channel 954 may be a downlink control channel, such as the PDCCH. A third channel 956 may be an uplink control channel, such as a PUCCH. A UAV (e.g., the UAV 504 of FIG. 5) and a base station (e.g., the base station 502 of FIG. 5) may communicate on the channels 952, 954, 956 using directional beamforming.

In particular, the UAV may obtain spatial relationship information (e.g., in a spatialRelationInfo field), which may then be applied across one or more of the channels, e.g., in a sub-6 GHz band. In some aspects, the UAV may use the same RX beam for the downlink data channel 952 and the downlink control channel 954, which may be based on at least one uplink SRS configured in an uplink BWP as the spatial relationship information, e.g., if a downlink reference signal with QCL Type-D is not configured.

For example, the beam for use on the downlink control channel 954 may be activated by a MAC control element (CE) indicating a TCI state or other identifier. Thus, the beam for use on the downlink control channel 954 may be configured in the UAV configuration via TCI state and spatial relationship information, as shown in TCI state configuration of Table 1, which may be applied with DM-RSs on the downlink control channel 954 according to the UAV configuration.

TABLE 1

| TCI State ID | QCL-Type1 | QCL-Type2 or Spatial Relationship Info |
|---|---|---|
| X0 | TRS or CSI-RS in DL BWP QCL-TypeA | TRS or CSI-RS in DL BWP QCL-TypeD or SRI = Z0 in UL BWP |

Similarly, the beam for use on the downlink data channel 952 may be activated by a MAC CE indicating a TCI state (or up to eight for the downlink data channel 952) or other identifier. In some aspects, however, the beam for use on the downlink data channel 952 may be activated via DCI of format 1_1 or 1_2 indicating one TCI state. Thus, the beam for use on the downlink data channel 952 may be configured in the UAV configuration via TCI state and spatial relationship information, as shown in TCI state configuration of Table 2, which may be applied with DM-RSs on the downlink data channel 952 according to the UAV configuration.

TABLE 2

| TCI State ID | QCL-Type1 | QCL-Type2 or Spatial Relationship Info |
|---|---|---|
| X1 | TRS or CSI-RS in DL BWP QCL-TypeA | TRS or CSI-RS in DL BWP QCL-TypeD or SRI = Z1 in UL BWP |

The beam that the UAV uses for some uplink control information on the uplink control channel 956 may be dynamically selected based on a downlink grant from the base station to the UAV. For example, the TCI state in a downlink grant may be applied for a beam to receive downlink data (e.g., being scheduled as indicated by the downlink grant), and the same beam direction or antenna polarization may be applied for the transmission on the uplink control channel 956 of feedback (e.g., HARQ ACK/NACK feedback) for the downlink data scheduled by the downlink grant. In another example, the beam that the UAV uses for some uplink control information on the uplink control channel 956 may be dynamically selected based on another field of the downlink grant or another message received at the UAV from the base station, such as a field specifically designed to carry such information in a downlink grant (e.g., a newly introduced field) or another field of the downlink grant (e.g., a field that is reused to convey spatial relationship information).

One or more beams for use on the uplink control channel 956 may be activated by a MAC CE indicating one or more configurations of spatial relationship information. In some aspects, however, the beam for use on the uplink control channel 956 may be dynamically switched via DCI of format 1_1 or 1_2 indicating which configuration of spatial relationship information (e.g., from multiple configurations for spatial relationship information activated via MAC CE) to use for the uplink control channel 956. Thus, the beam for use on the uplink control channel 956 may be configured in the UAV configuration via TCI state and spatial relationship information, as shown in spatial relationship information configuration of Table 3, which may be applied with DM-RSs on the uplink control channel 956 according to the UAV configuration.

TABLE 2

| PUCCH-SpatialRelationInfoID | PUCCH-SpatialRelationInfo |
|---|---|
| Y1 | SSB, CSI-RS in DL BWP SRI = Z1 in UL BWP as TX beam |

Although directional beamforming may improve some UAV communication in FR1, beams may not be generated and applied instantaneously. For example, K0 may reflect a time period for the UAV based on reception of the downlink control channel 954 and application of spatial QCL information received in DCI for downlink data channel 952 processing. If an analog TX/RX beam is used at the UAV (e.g., directional antenna or antenna panels), K1 may reflect a time period for the UAV based on analog beam switching for communication on the uplink control channel 956 (e.g., of feedback for one of the downlink channels 952, 954).

The UAV may need to report some estimation of this delay, such as during capability reporting to the network, at which time the UAV may report other capability information related to UAV configuration of directional beamforming in the sub-6 GHz band. For example, the UAV may report a capability for the number of TX and RX beam changes the UAV can perform on the sub-6 GHz band within a slot (e.g., maxNumberRxTxBeamSwitchDL).

Further, the capability information according to the UAV configuration can be extended to indicate a capability for supporting spatial relationships in the sub-6 GHz band (e.g., spatialRelations). The UAV may report capability in the sub-6 GHz band for the maximum number of configured spatial relations per component carrier for PUCCH and SRS (e.g., maxNumberConfiguredSpatialRelations) and/or for the maximum number of active spatial relations with regard to PUCCH and SRS for PUSCH, per BWP per component carrier (e.g., maxNumberActiveSpatialRelations). In some aspects, for a PDSCH, the UAV may report capability in the sub-6 GHz band for support of simultaneous reception with different QCL Type D for use on the PDSCH (e.g., simultaneousReceptionDiffTypeD-r16).

For the change of TCI state between the downlink control channel 954 and the downlink data channel 952, a capability may be configured according to the UAV configuration. For example, a time duration for QCL (e.g., TimeDurationForQCL) in the sub-6 GHz band with subcarrier spacing (SCS) of 15 KHz or 30 KHz may be configured to include some enumerated values, e.g., s1, s3, s7 for 15 KHz SCS, or one of s3, s7, s14 for 30 KHz SCS, which correspond to a minimum number of symbols required by the UAV to perform reception of the downlink control channel 954 and applying spatial QCL information received in DCI for downlink data channel 952 processing. If K0 is greater than or equal to the time duration for QCL, QCL may be set to TCI state X1, shown above in Table 2, indicated on the downlink control channel. Otherwise, default QCL is the most recent downlink control channel TCI state X0, shown in Table 1.

For CSI-RS beam switching, a capability for the UAV in sub-6 GHz bands may be defined (e.g., beamSwitchTiming) for SCS of 15 KHz or 30 KHz. Enumerated value corresponding to time durations (e.g., number of symbols) may be used, e.g., with s1, s3, s7 for 15 KHz SCS, or one of s3, s7, s14 for 30 KHz SCS.

Figure 10:
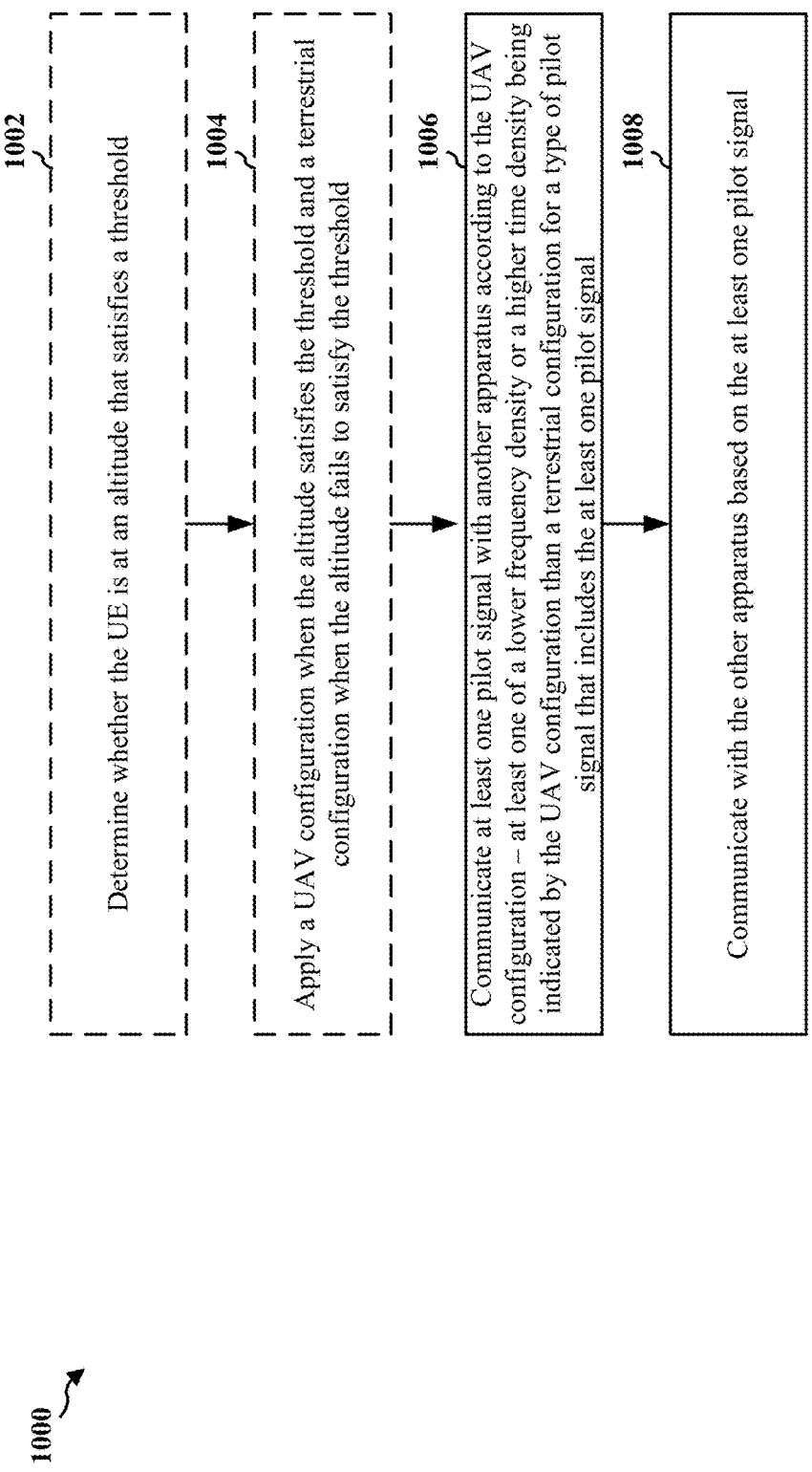
FIG. 10 is a flowchart of a method of wireless communication by an apparatus.

FIG. 10 is a flowchart of a method 1000 of wireless communication by an apparatus. For example, the method may be performed by a UE (e.g., the UE 104; the apparatus 1302), a UAV (e.g., the UAV 104', 504), or a base station (e.g., the base station 102/180; 502 the apparatus 1402).

At 1002, the apparatus may determine whether a UAV is at an elevation that satisfies a threshold. For example, the apparatus may measure or otherwise obtain the elevation of the UE above the ground, and then the UE may compare the measured elevation to the elevational threshold. For example, referring to FIG. 5-9, the UAV 504 and/or the base station may determine whether the beam 510 is at an elevation that satisfies a threshold.

At 1004, the apparatus may apply a UAV configuration when the altitude satisfies the threshold or a terrestrial configuration when the altitude fails to satisfy the threshold. To do so, the apparatus may select, identify, or calculate a set of antenna weights and a spatial filter, and then the apparatus may adjust a beamforming direction based on the weight and/or filter. For example, referring to FIG. 5-9, the UAV 504 and/or the base station may apply a UAV configuration (e.g., the UAV configuration 616 or the transmission comb 800) when the altitude satisfies the threshold or a terrestrial configuration when the altitude fails to satisfy the threshold.

At 1006, the apparatus may communicate at least one pilot signal with another apparatus according to the UAV configuration. At least one of a lower frequency density or a higher time density may be indicated by the UAV configuration than a terrestrial configuration for a type of pilot signal that includes the at least one pilot signal. If the apparatus is at a base station, then this communication may include transmitting a TRSs or CSI-RSs and/or receiving SRSs and indicating a selected beam based on the SRSs. If the apparatus is at a UAV, then this communication may include transmitting SRSs and receiving a selected beam based on the SRSs and/or receiving TRSs or CSI-RSs for beamforming in sub-6 GHz bands. For example, referring to FIG. 5-9, one of the UAV 504 or the base station may communicate at least one pilot signal with the other of the UAV 504 or base station 502 according to the UAV configuration 616, which includes a lower frequency density and a higher time density than the terrestrial configuration 614. In some aspects, the apparatus may communicate information corresponding to a directional beam via which a SRS is transmitted to the base station in a directional beam sweep associated with UAVs, with the directional beam being used for communication with the other apparatus based on the information identifying the signal.

At 1008, the apparatus may communicate with the other apparatus based on at the at least one pilot signal. If the apparatus is at a base station, then the apparatus may configure or assist with directional beamforming by the other apparatus, such as by providing feedback related to beams. If the apparatus is at a UAV, the apparatus may use directional beamforming in a sub-6 GHz band to transmit and/or receive signaling. For example, referring to FIG. 5-9, one of the UAV 504 or the base station may communicate with the other of the UAV 504 or base station 502 according to the UAV configuration 616 or the transmission comb 800.

Figure 11:
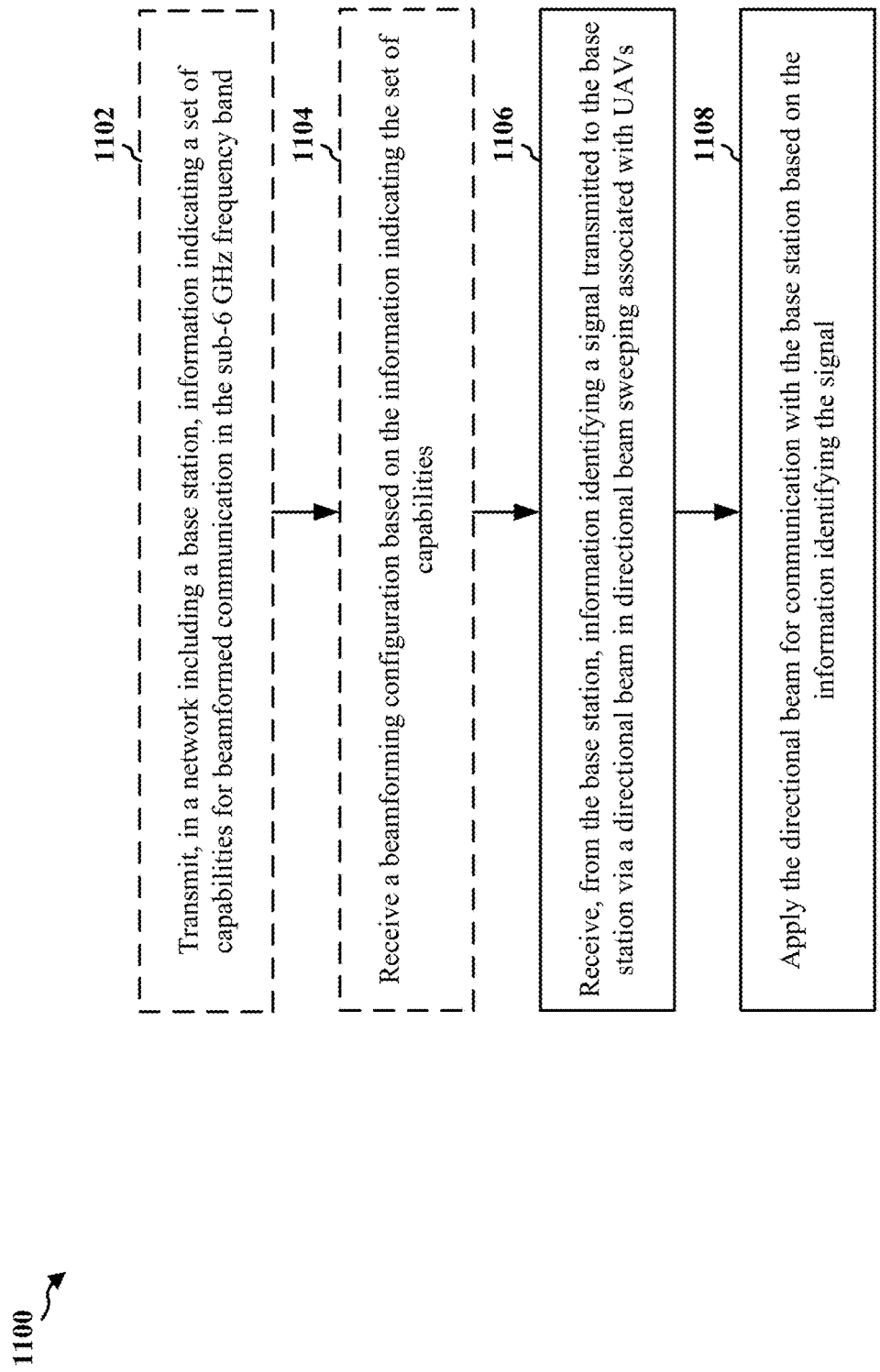
FIG. 11 is a flowchart of a method of wireless communication by a UE.

FIG. 11 is a flowchart of a method 1100 of wireless communication by a UAV UE. The method 1100 may be performed by a UE (e.g., the UE 104; the apparatus 1302) or a UAV (e.g., the UAV 104', 504).

At 1102, the UAV UE may transmit, in a network including the base station, information indicating a set of capabilities for beamformed communication in the sub-6 GHz frequency band. For example, referring to FIG. 5-9, the UAV 504 may transmit, in a network including the base station, information indicating a set of capabilities for beamformed communication in the sub-6 GHz frequency band, e.g., on the channels 952, 954, 956.

At 1104, the UAV UE may receive a beamforming configuration based on the information indicating the set of capabilities. For example, the beamforming configuration may include a TCI state or spatial relationship information that can be applied in a sub-6 GHz network. For example, referring to FIG. 5-9, the UAV 504 may receive information indicating the UAV configuration 616 or the transmission comb 800 from the base station 502.

At 1106, the UAV UE may receive, from a base station, spatial relationship information or TCI state information corresponding to a directional beam at the UE for communication on a channel. For example, referring to FIG. 5-9, the UAV 504 may receive, from the base station 502, spatial relationship information or TCI state information corresponding to a directional beam at the UAV 504 for communication on one of the channels 952, 954, 956.

At 1108, the UAV UE may apply the directional beam for communication with the base station on another channel in a sub-6 GHz frequency band. For example, the UE may configure one channel with the spatial filter of another channel, and the UE may transmit signaling with the spatial filter from the other channel. For example, referring to FIG. 5-9, the UAV 504 may apply a directional beam for communication with the base station 502 on another one of the channels 952, 954, 956 in a sub-6 GHz frequency band.

Figure 12:
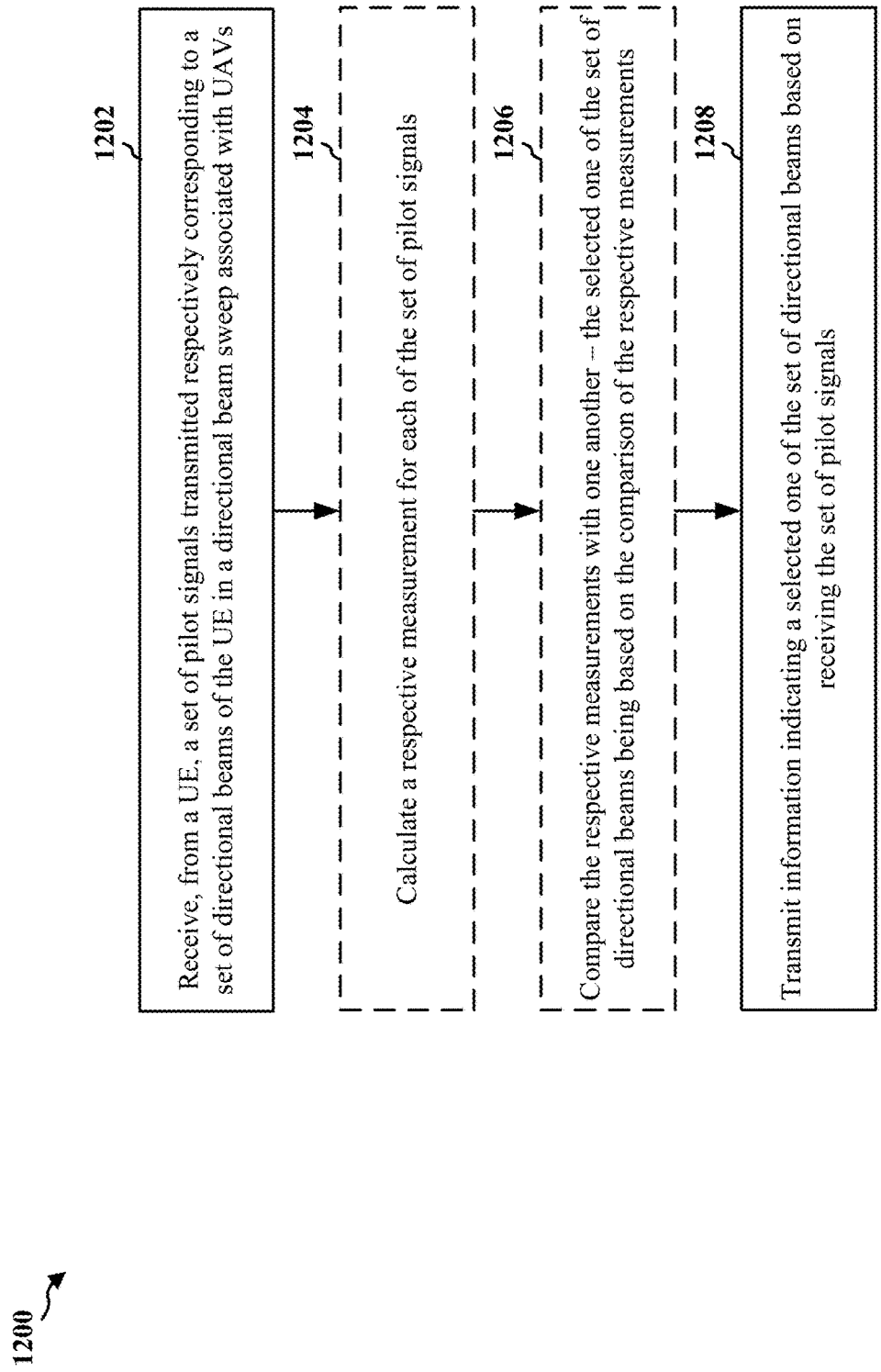
FIG. 12 is a flowchart of a method of wireless communication by an apparatus.

FIG. 12 is a flowchart of a method 1200 of wireless communication by an apparatus. The method 1200 may be performed by a base station (e.g., the base station 102/180, 502; the apparatus 1402.

At 1202, the base station may receive, from a UE, a set of pilot signals respectively corresponding to a set of directional beams of the UE in a directional beam sweep associated with UAVs. For example, the pilot signals may include SRSs. For example, referring to FIG. 5-9, the base station 502 may receive, from the UAV 504, a set of pilot signals respectively corresponding to a set of directional beams of the UE in a directional beam sweep associated with UAVs, which may be in the transmission comb 800.

At 1204, the base station may calculate a respective measurement for each of the set of pilot signals. For example, the base station may detect energy with which a pilot signal is received, and then the base station may convert that detected energy into a measurement value, such as reference signal receive power (RSRP), signal-to-noise ratio (SNR), and the like. For example, referring to FIG. 5-9, the base station 502 may calculate a respective measurement for each of the set of pilot signals.

At 1206, the base station may compare the respective measurements with one another. For example, the base station may select a first measurement corresponding to one pilot signal and a second measurement corresponding to another pilot signal, the base station may then determine which measurement is greater. For example, referring to FIG. 5-9, the base station 502 may compare the respective measurements with one another.

At 1208, the base station may transmit information indicating a selected one of the set of directional beams based on receiving the set of pilot signals. The selected one of the set of directional beams may correspond to the pilot signal with the highest or best measurement. For example, referring to FIG. 5-9, the base station 502 may transmit information indicating a selected one of the set of directional beams based on receiving the set of pilot signals to the UAV 504.

Figure 13:
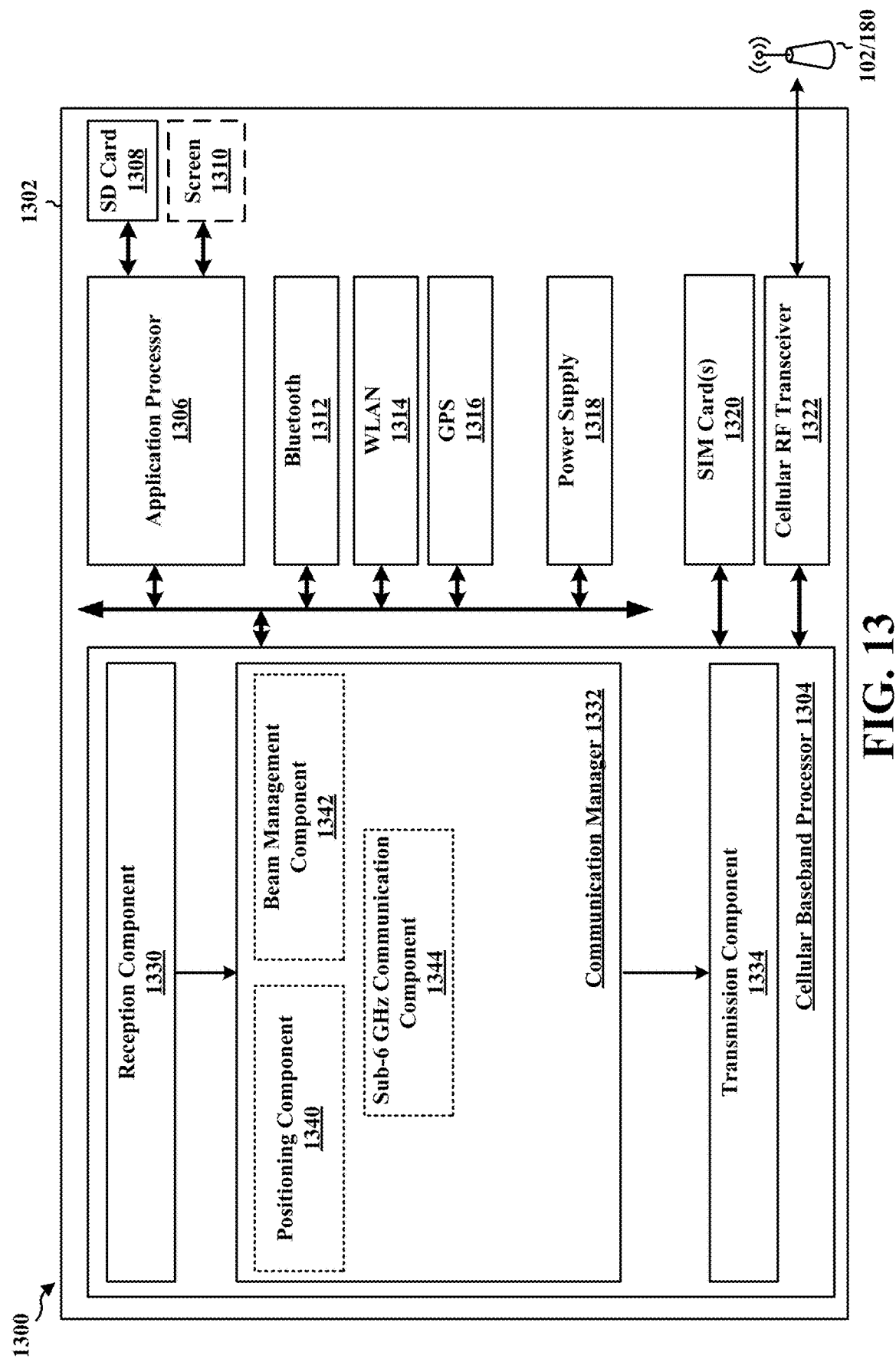
FIG. 13 is a diagram illustrating an example of a hardware implementation for an example apparatus.

FIG. 13 is a diagram 1300 illustrating an example of a hardware implementation for an apparatus 1302. The apparatus 1302 is a UE and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304.

In the context of FIG. 3, the cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., the UE 350 of FIG. 3) and include the aforediscussed additional modules of the apparatus 1302. In one configuration, the cellular RF transceiver 1322 may be implemented as at least one of the transmitter 354TX and/or the receiver 354RX.

The communication manager 1332 includes a positioning component 1340 that is configured to determine whether a UAV is at an elevation that satisfies a threshold, e.g., as described in connection with 1002 of FIG. 10.

The communication manager 1332 further includes a beam management component 1342 that is configured to apply a UAV configuration when the altitude satisfies the threshold or a terrestrial configuration when the altitude fails to satisfy the threshold, e.g., as described in connection with 1004 of FIG. 10.

At least one of the reception component 1330 or the transmission component 1334 may be configured to communicate at least one pilot signal with the base station 102/180 according to the UAV configuration, e.g., as described in connection with 1006 of FIG. 10. At least one of a lower frequency density or a higher time density may be indicated by the UAV configuration than a terrestrial configuration for a type of pilot signal that includes the at least one pilot signal. The communication may include transmitting SRSs and receiving a selected beam based on the SRSs and/or receiving TRSs or CSI-RSs for beamforming in sub-6 GHz bands.

At least one of the reception component 1330 or the transmission component 1334 may be configured to communicate with the base station 102/180 based on at the at least one pilot signal, e.g., as described in connection with 1008 of FIG. 10. For example, the apparatus may use directional beamforming in a sub-6 GHz band to transmit and/or receive signaling.

The transmission component 1334 may be configured to transmit, in a network including the base station, information indicating a set of capabilities for beamformed communication in the sub-6 GHz frequency band, e.g., as described in connection with 1102 of FIG. 11.

The reception component 1330 may be configured to receive a beamforming configuration based on the information indicating the set of capabilities, e.g., as described in connection with 1104 of FIG. 11.

The reception component 1330 may be configured to receive, from a base station, spatial relationship information or TCI state information corresponding to a directional beam at the UE for communication on a channel, e.g., as described in connection with 1106 of FIG. 11.

The communication manager 1332 further includes a sub-6 GHz communication component 1344 that is configured to apply the directional beam for communication with the base station on another channel in a sub-6 GHz frequency band, e.g., as described in connection with 1108 of FIG. 11.

The apparatus 1302 may include additional components that perform some or all of the blocks, operations, signaling, etc. of the algorithm(s) in the aforementioned flowchart(s) of FIGS. 10-11. As such, some or all of the blocks, operations, signaling, etc. in the aforementioned flowchart(s) of FIGS. 10-11 may be performed by a component and the apparatus 1302 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for communicating at least one pilot signal with another apparatus according to a first configuration, at least one of a lower frequency density or a higher time density being indicated by the first configuration than a second configuration for a type of pilot signal that includes the at least one pilot signal; and means for communicating with the other apparatus based on the at least one pilot signal.

In one configuration, the first configuration is associated with UAV communication and the second configuration is associated with terrestrial communication, and wherein the lower frequency density comprises a lower number of subcarriers and the higher time density comprises a greater number of symbols.

In one configuration, the apparatus 1302, and in particular the baseband unit 1304, includes means for determining whether the UE is at an elevation that satisfies a threshold; and means for applying the first configuration when the elevation satisfies the threshold and applying the second configuration when the elevation fails to satisfy the threshold.

In one configuration, the at least one pilot signal comprises a set of pilot signals in a same symbol having one of the set of pilot signals every eight subcarriers or twelve subcarriers according to the lower frequency density indicated by the first configuration.

In one configuration, the at least one pilot signal is carried in at least one of every one symbol, two symbols, or four symbols, or in one, two, three, or four consecutive slots according to the higher time density indicated by the first configuration.

In one configuration, the apparatus 1302, and in particular the baseband unit 1304, includes means for communicating the at least one pilot signal with the other apparatus in a sub-6 GHz frequency band, wherein the first configuration is applicable to at least the sub-6 GHz frequency band.

In one configuration, the means for communicating the at least one pilot signal is configured to receive the at least one pilot signal from the other apparatus.

In one configuration, the means for communicating the at least one pilot signal is configured to transmit the at least one pilot signal to the other apparatus.

In one configuration, the at least one pilot signal comprises at least one sounding reference signal communicated on a transmission comb of eight subcarriers or twelve subcarriers for beam management according to the first configuration.

In one configuration, the apparatus 1302, and in particular the baseband unit 1304, includes means for communicating information corresponding to a directional beam via which a SRS is transmitted to the base station in a directional beam sweep associated with UAVs, the directional beam being used for communication with the other apparatus based on the information identifying the signal.

In one configuration, the apparatus 1302, and in particular the cellular baseband processor 1304, includes means for receiving, from a base station, spatial relationship information or TCI state information corresponding to a directional beam at the UE for communication on a channel; and means for applying the directional beam for communication with the base station on another channel in a sub-6 GHz frequency band.

In one configuration, the means for applying the directional beam for communication is configured to apply the directional beam for communication on one of a control channel or a downlink data channel, the beam being configured for the other of the control channel or the downlink data channel.

In one configuration, the control channel comprises an uplink control channel.

In one configuration, the apparatus 1302, and in particular the cellular baseband processor 1304, includes means for transmitting, in a network including the base station, information indicating a set of capabilities for beamformed communication in the sub-6 GHz frequency band; and means for receiving a beamforming configuration based on the information indicating the set of capabilities.

In one configuration, the information corresponding to the directional beam comprises at least one of a resource indicator for the SRS configured in an uplink bandwidth part and transmitted via the directional beam or a TCI state.

The aforementioned means may be one or more of the aforementioned components of the apparatus 1302 configured to perform the functions recited by the aforementioned means. As described supra, the apparatus 1302 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
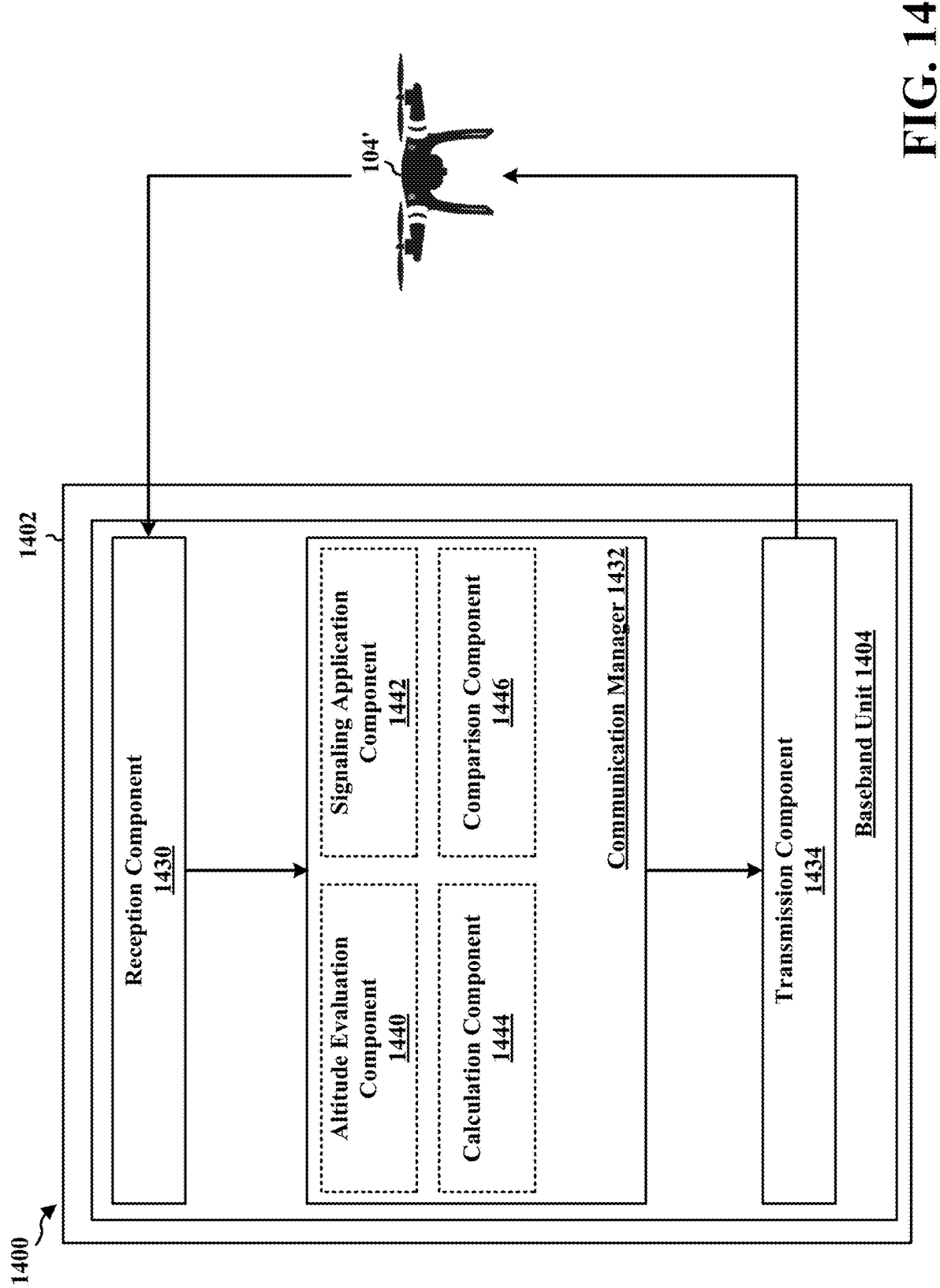
FIG. 14 is a diagram illustrating another example of a hardware implementation for another example apparatus.

FIG. 14 is a diagram 1400 illustrating an example of a hardware implementation for an apparatus 1402. The apparatus 1402 is a base station and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 310 and may include the memory 376 and/or at least one of the TX processor 316, the RX processor 370, and the controller/processor 375.

The communication manager 1432 includes an altitude evaluation component 1440 that is configured to determine whether a UAV 104' is at an elevation that satisfies a threshold, e.g., as described in connection with 1102 of FIG. 11.

The communication manager 1432 further includes a signaling application component 1442 that is configured to apply a UAV configuration when the altitude satisfies the threshold or a terrestrial configuration when the altitude fails to satisfy the threshold, e.g., as described in connection with 1104 of FIG. 11.

At least one of the transmission component 1434 or the reception component 1430 may be configured to communicate at least one pilot signal with another apparatus according to the UAV configuration, e.g., as described in connection with 1106 of FIG. 11. At least one of a lower frequency density or a higher time density may be indicated by the UAV configuration than a terrestrial configuration for a type of pilot signal that includes the at least one pilot signal.

At least one of the transmission component 1434 or the reception component 1430 may be configured to communicate with the other apparatus based on at the at least one pilot signal, e.g., as described in connection with 1108 of FIG. 11.

The reception component 1430 may be configured to receive, from the UAV 104', a set of pilot signals respectively corresponding to a set of directional beams at the UAV 104' in a directional beam sweep associated with UAVs, e.g., as described in connection with 1202 of FIG. 12.

The communication manager 1432 further includes a calculation component 1444 that is configured to calculate a respective measurement for each of the set of pilot signals, e.g., as described in connection with 1204 of FIG. 12.

The communication manager 1432 further includes a comparison component 1446 that is configured to compare the respective measurements with one another, e.g., as described in connection with 1206 of FIG. 12.

The transmission component 1434 may be configured to transmit information indicating a selected one of the set of directional beams based on receiving the set of pilot signals, e.g., as described in connection with 1208 of FIG. 12. The selected one of the set of directional beams may correspond to the pilot signal with the highest or best measurement.

The apparatus 1402 may include additional components that perform some or all of the blocks, operations, signaling, etc. of the algorithm(s) in the aforementioned flowchart(s) of FIGS. 10 and 12. As such, some or all of the blocks, operations, signaling, etc. in the aforementioned flowchart (s) of FIGS. 10 and 12 may be performed by a component and the apparatus 1402 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for communicating at least one pilot signal with another apparatus according to a first configuration, at least one of a lower frequency density or a higher time density being indicated by the first configuration than a second configuration for a type of pilot signal that includes the at least one pilot signal; and means for communicating with the other apparatus based on the at least one pilot signal.

In one configuration, the first configuration is associated with UAV communication and the second configuration is associated with terrestrial communication, and wherein the lower frequency density comprises a lower number of subcarriers and the higher time density comprises a greater number of symbols.

In one configuration, the apparatus 1402, and in particular the baseband unit 1404, includes means for determining whether the UE is at an elevation that satisfies a threshold; and means for applying the first configuration when the elevation satisfies the threshold and applying the second configuration when the elevation fails to satisfy the threshold.

In one configuration, the at least one pilot signal comprises a set of pilot signals in a same symbol having one of the set of pilot signals every eight subcarriers or twelve subcarriers according to the lower frequency density indicated by the first configuration.

In one configuration, the at least one pilot signal is carried in at least one of every one symbol, two symbols, or four symbols, or in one, two, three, or four consecutive slots according to the higher time density indicated by the first configuration.

In one configuration, the apparatus 1402, and in particular the baseband unit 1404, includes means for communicating the at least one pilot signal with the other apparatus in a sub-6 GHz frequency band, wherein the first configuration is applicable to at least the sub-6 GHz frequency band.

In one configuration, the means for communicating the at least one pilot signal is configured to receive the at least one pilot signal from the other apparatus.

In one configuration, the means for communicating the at least one pilot signal is configured to transmit the at least one pilot signal to the other apparatus.

In one configuration, the at least one pilot signal comprises at least one sounding reference signal communicated on a transmission comb of eight subcarriers or twelve subcarriers for beam management according to the first configuration.

In one configuration, the apparatus 1402, and in particular the baseband unit 1404, includes means for communicating information corresponding to a directional beam via which a SRS is transmitted to the base station in a directional beam sweep associated with UAVs, the directional beam being used for communication with the other apparatus based on the information identifying the signal.

In one configuration, the apparatus 1402, and in particular the baseband unit 1404, includes means for receiving, from a UE, a set of pilot signals respectively corresponding to a set of directional beams of the UE in a directional beam sweep associated with UAVs; and means for transmitting information indicating a selected one of the set of directional beams based on receiving the set of pilot signals.

In one configuration, the apparatus 1402, and in particular the baseband unit 1404, includes means for calculating a respective measurement for each of the set of pilot signals; and means for comparing the respective measurements with one another, wherein the selected one of the set of directional beams is based on the comparison of the respective measurements.

In one configuration, the information indicating the selected one of the set of directional beams comprises at least one of a resource indicator for a sounding reference signal transmitted via the selected one of the set of directional beams or a TCI state associated with the selected one of the set of directional beams.

In one configuration, the information indicating the selected one of the set of directional beams indicates that the selected one of the set of directional beams is applicable to communication with the UE on at least one uplink channel and at least one downlink channel The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The following examples are illustrative and may be combined with the various concepts and aspects expressly or impliedly described herein, without limitation.

Example 1 is an apparatus for wireless communication, the apparatus having a memory and at least one processor coupled to the memory, and the at least one processor is configured to: communicate at least one pilot signal with another apparatus according to a first configuration, at least one of a lower frequency density or a higher time density being indicated by the first configuration than a second configuration for a type of pilot signal that includes the at least one pilot signal; and communicate with the other apparatus based on the at least one pilot signal.

Example 2 may be the apparatus of example 1, and the first configuration is associated with UAV communication and the second configuration is associated with terrestrial communication, and wherein the lower frequency density comprises a lower number of subcarriers and the higher time density comprises a greater number of symbols.

Example 3 may be the apparatus of example 1, with the at least one processor being further configured to: determine whether the other apparatus is at an elevation that satisfies a threshold; and apply the first configuration when the elevation satisfies the threshold and apply the second configuration when the elevation fails to satisfy the threshold.

Example 4 may be the apparatus of any of examples 1 through 3, wherein the at least one pilot signal comprises a set of pilot signals in a same symbol having one of the set of pilot signals every eight subcarriers or twelve subcarriers according to the lower frequency density indicated by the first configuration.

Example 5 may be the apparatus of any of examples 1 through 4, wherein the at least one pilot signal is carried in at least one of every one symbol, two symbols, or four symbols, or in one, two, three, or four consecutive slots according to the higher time density indicated by the first configuration.

Example 6 may be the apparatus of any of examples 1 through 5, the communication of the at least one pilot signal comprises to: communicate the at least one pilot signal with the other apparatus in a sub-6 gigahertz (GHz) frequency band, wherein the first configuration is applicable to at least the sub-6 GHz frequency band.

Example 7 may be the apparatus of any of examples 1 through 5, and the communication of the at least one pilot signal comprises to: receive the at least one pilot signal from the other apparatus.

Example 8 may be the apparatus of any of examples 1 through 6, and the communication of the at least one pilot signal comprises to: transmit the at least one pilot signal to the other apparatus.

Example 9 may be the apparatus of any of examples the at least one pilot signal comprises at least one sounding reference signal communicated on a transmission comb of eight subcarriers or twelve subcarriers for beam management according to the first configuration.

Example 10 may be the apparatus of example 9, with the at least one processor being further configured to: communicate information corresponding to a directional beam via which a SRS is transmitted to the other apparatus in a directional beam sweep associated with UAVs, the directional beam being used for communication with the other apparatus based on the information identifying the signal.

Example 11 may be the apparatus of any of examples 1 through 10, and the apparatus is implemented in a base station or a UE.

Example 12 is an apparatus for wireless communication at a UE having a memory and at least one processor coupled to the memory, and the at least one processor is configured to: receive, from a base station, spatial relationship information or TCI state information corresponding to a directional beam at the UE for communication on a channel; and apply the directional beam for communication with the base station on another channel in a sub-6 GHz frequency band.

Example 13 may be the apparatus of example 12, wherein the application of the directional beam for communication comprises to: apply the directional beam for communication on one of a control channel or a downlink data channel, the beam being configured for the other of the control channel or the downlink data channel.

Example 14 may be the apparatus of any of examples 12 through 13, wherein the control channel comprises an uplink control channel.

Example 15 may be the apparatus of any of examples 12 through 13, with the at least one processor being further configured to: transmit, in a network including the base station, information indicating a set of capabilities for beamformed communication in the sub-6 GHz frequency band; and receive a beamforming configuration based on the information indicating the set of capabilities.

Example 16 may be the apparatus of any of examples 12 through 15, wherein the spatial relationship information or TCI state information corresponding to the directional beam comprises a resource indicator for a sounding reference signal (SRS) configured in an uplink bandwidth part and transmitted via the directional beam.

Example 17 is an apparatus for wireless communication at a UE having a memory and at least one processor coupled to the memory: receiving, from a UE, a set of pilot signals respectively corresponding to a set of directional beams of the UE in a directional beam sweep associated with UAVs; and transmit information indicating a selected one of the set of directional beams based on receiving the set of pilot signals.

Example 18 may be the apparatus of example 17, with the at least one processor being further configured to: calculate a respective measurement for each of the set of pilot signals; and compare the respective measurements with one another, wherein the selected one of the set of directional beams is based on the comparison of the respective measurements.

Example 19 may be the apparatus of one of examples 17 or 18, the information indicating the selected one of the set of directional beams comprises at least one of a resource indicator for a sounding reference signal transmitted via the selected one of the set of directional beams or a TCI state associated with the selected one of the set of directional beams.

Example 20 may be the apparatus of one of examples 17 or 18, wherein the information indicating the selected one of the set of directional beams indicates that the selected one of the set of directional beams is applicable to communication with the UE on at least one uplink channel and at least one downlink channel.

Example 21 may be the apparatus of any of examples 17 or 21, wherein the set of pilot signals comprises a set of sounding reference signals received in a sub-6 GHz frequency band.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication performed by a user equipment (UE), comprising:
   transmitting, in a network including a base station, information indicating a set of capabilities for beamformed communication in a sub-6 gigahertz (GHz) frequency band, the capabilities including one or more of:
   a number of transmit and receive beam changes the UE can perform on the sub-6 GHz band within a slot,
   a maximum number of configured spatial relations per component carrier for a physical uplink control channel (PUCCH) and sounding reference signal (SRS) on the sub-6 GHz band,
   a maximum number of active spatial relations with regard to PUCCH and SRS for a physical uplink shared channel (PUSCH), per bandwidth part (BWP) per component carrier on the sub-6 GHz band, or
   support of simultaneous reception with different quasi-co-location (QCL) Type D for use on a physical downlink shared channel (PDSCH) on the sub-6 GHz band;
   receiving a beamforming configuration based on the information indicating the set of capabilities;
   receiving, from the base station, spatial relationship information or transmission configuration indicator (TCI) state information corresponding to a directional beam at the UE for communication on a first channel; and
   applying the directional beam for communication with the base station on another channel in the sub-6 GHz frequency band.

2. The method of claim 1, wherein the applying the directional beam for communication comprises:
   applying the directional beam for communication on one of a control channel or a downlink data channel, the beam being configured for the other of the control channel or the downlink data channel.

3. The method of claim 2, wherein the control channel comprises an uplink control channel.

4. The method of claim 1, wherein the spatial relationship information or TCI state information corresponding to the directional beam comprises a resource indicator for a sounding reference signal (SRS) configured in an uplink bandwidth part and transmitted via the directional beam.

5. The method of claim 1, wherein the set of capabilities for beamformed communication in a sub-6 GHz frequency band includes the number of transmit and receive beam changes the UE can perform on the sub-6 GHz band within a slot.

6. The method of claim 1, wherein the set of capabilities for beamformed communication in a sub-6 GHz frequency band includes the maximum number of configured spatial relations per component carrier for the PUCCH and the SRS on the sub-6 GHz band.

7. The method of claim 1, wherein the set of capabilities for beamformed communication in a sub-6 GHz frequency band includes the maximum number of active spatial relations with regard to PUCCH and SRS for the PUSCH, per BWP per component carrier on the sub-6 GHz band.

8. The method of claim 1, wherein the set of capabilities for beamformed communication in a sub-6 GHz frequency band includes support of simultaneous reception with different QCL Type D for use on the PDSCH on the sub-6 GHz band.

9. A method of wireless communication performed by a base station, comprising:
   receiving, information indicating a set of capabilities of a user equipment (UE) for beamformed communication in a sub-6 gigahertz (GHz) frequency band, the capabilities including one or more of:
   a number of transmit and receive beam changes the UE can perform on the sub-6 GHz band within a slot,
   a maximum number of configured spatial relations per component carrier for a physical uplink control channel (PUCCH) and sounding reference signal (SRS) on the sub-6 GHz band,
   a maximum number of active spatial relations with regard to PUCCH and SRS for a physical uplink shared channel (PUSCH), per bandwidth part (BWP) per component carrier on the sub-6 GHz band, or
   support of simultaneous reception with different quasi-co-location (QCL) Type D for use on a physical downlink shared channel (PDSCH) on the sub-6 GHz band;
   transmitting a beamforming configuration based on the information indicating the set of capabilities;
   receiving, from the UE, a set of pilot signals respectively corresponding to a set of directional beams of the UE in a directional beam sweep associated with a resource mapping for unmanned aerial vehicles (UAVs); and
   transmitting information indicating a selected one of the set of directional beams based on receiving the set of pilot signals.

10. The method of claim 9, further comprising:
    calculating a respective measurement for each of the set of pilot signals; and
    comparing the respective measurements with one another, wherein the selected one of the set of directional beams is based on the comparison of the respective measurements.

11. The method of claim 9, wherein the information indicating the selected one of the set of directional beams comprises at least one of a resource indicator for a sounding reference signal transmitted via the selected one of the set of directional beams or a transmission configuration indicator (TCI) state associated with the selected one of the set of directional beams.

12. The method of claim 9, wherein the information indicating the selected one of the set of directional beams indicates that the selected one of the set of directional beams is applicable to communication with the UE on at least one uplink channel and at least one downlink channel.

13. The method of claim 9, wherein the set of pilot signals comprises a set of sounding reference signals received in the sub-6 GHz frequency band.

14. An apparatus for wireless communication by a user equipment (UE), comprising:
    a memory; and
    at least one processor coupled to the memory, wherein the at least one processor is configured to:

transmit, in a network including a base station, information indicating a set of capabilities for beamformed communication in a sub-6 gigahertz (GHz) frequency band, the capabilities including one or more of:
- a number of transmit and receive beam changes the UE can perform on the sub-6 GHz band within a slot,
- a maximum number of configured spatial relations per component carrier for a physical uplink control channel (PUCCH) and sounding reference signal (SRS) on the sub-6 GHz band,
- a maximum number of active spatial relations with regard to PUCCH and SRS for a physical uplink shared channel (PUSCH), per bandwidth part (BWP) per component carrier on the sub-6 GHz band, or
- support of simultaneous reception with different quasi-co-location (QCL) Type D for use on a physical downlink shared channel (PDSCH) on the sub-6 GHz band;

receive a beamforming configuration based on the information indicating the set of capabilities;
receive, from a base station, spatial relationship information or transmission configuration indicator (TCI) state information corresponding to a directional beam at the apparatus for communication on a channel; and
apply the directional beam for communication with the base station on another channel in the sub-6 GHz frequency band.

15. The apparatus of claim 14, wherein, to apply the directional beam for communication, the at least one processor is configured to:
apply the directional beam for communication on one of a control channel or a downlink data channel, the beam being configured for the other of the control channel or the downlink data channel.

16. The apparatus of claim 15, wherein the control channel comprises an uplink control channel.

17. The apparatus of claim 14, wherein the spatial relationship information or TCI state information corresponding to the directional beam comprises a resource indicator for a sounding reference signal (SRS) configured in an uplink bandwidth part and transmitted via the directional beam.

18. The apparatus of claim 14, wherein the set of capabilities for beamformed communication in a sub-6 GHz frequency band includes the number of transmit and receive beam changes the UE can perform on the sub-6 GHz band within a slot.

19. The apparatus of claim 14, wherein the set of capabilities for beamformed communication in a sub-6 GHz frequency band includes the maximum number of configured spatial relations per component carrier for the PUCCH and the SRS on the sub-6 GHz band.

20. The apparatus of claim 14, wherein the set of capabilities for beamformed communication in a sub-6 GHz frequency band includes the maximum number of active spatial relations with regard to PUCCH and SRS for the PUSCH, per BWP per component carrier on the sub-6 GHz band.

21. The apparatus of claim 14, wherein the set of capabilities for beamformed communication in a sub-6 GHz frequency band includes support of simultaneous reception with different QCL Type D for use on the PDSCH on the sub-6 GHz band.

22. An apparatus for wireless communication, comprising:
a memory; and
at least one processor coupled to the memory, wherein the at least one processor is configured to:

receive, information indicating a set of capabilities of a user equipment (UE) for beamformed communication in a sub-6 gigahertz (GHz) frequency band, the capabilities including one or more of:
- a number of transmit and receive beam changes the UE can perform on the sub-6 GHz band within a slot,
- a maximum number of configured spatial relations per component carrier for a physical uplink control channel (PUCCH) and sounding reference signal (SRS) on the sub-6 GHz band,
- a maximum number of active spatial relations with regard to PUCCH and SRS for physical uplink shared channel (PUSCH), per bandwidth part (BWP) per component carrier on the sub-6 GHz band, or
- support of simultaneous reception with different quasi-co-location (QCL) Type D for use on a physical downlink shared channel (PDSCH) on the sub-6 GHz band;

transmit a beamforming configuration based on the information indicating the set of capabilities;
receive, from a user equipment (UE), a set of pilot signals respectively corresponding to a set of directional beams of the UE in a directional beam sweep associated with a resource mapping for unmanned aerial vehicles (UAVs); and
transmit information indicating a selected one of the set of directional beams based on receiving the set of pilot signals.

23. The apparatus of claim 22, wherein the at least one processor is further configured to:
calculate a respective measurement for each of the set of pilot signals; and
compare the respective measurements with one another, wherein the selected one of the set of directional beams is based on the comparison of the respective measurements.

24. The apparatus of claim 22, wherein the information indicating the selected one of the set of directional beams comprises at least one of a resource indicator for a sounding reference signal transmitted via the selected one of the set of directional beams or a transmission configuration indicator (TCI) state associated with the selected one of the set of directional beams.

25. The apparatus of claim 22, wherein the information indicating the selected one of the set of directional beams indicates that the selected one of the set of directional beams is applicable to communication with the UE on at least one uplink channel and at least one downlink channel.

26. The apparatus of claim 22, wherein the set of pilot signals comprises a set of sounding reference signals received in the sub-6 GHz frequency band.

27. The apparatus of claim 22, wherein the set of capabilities for beamformed communication in a sub-6 GHz frequency band includes the number of transmit and receive beam changes the UE can perform on the sub-6 GHz band within a slot.

28. The apparatus of claim 22, wherein the set of capabilities for beamformed communication in a sub-6 GHz frequency band includes the maximum number of configured spatial relations per component carrier for the PUCCH and the SRS on the sub-6 GHz band.

29. The apparatus of claim 22, wherein the set of capabilities for beamformed communication in a sub-6 GHz frequency band includes the maximum number of active spatial relations with regard to PUCCH and SRS for the PUSCH, per BWP per component carrier on the sub-6 GHz band.

30. The apparatus of claim 22, wherein the set of capabilities for beamformed communication in a sub-6 GHz frequency band includes support of simultaneous reception with different QCL Type D for use on the PDSCH on the sub-6 GHz band.

* * * * *